(12) United States Patent
Doney

(10) Patent No.: US 12,190,385 B2
(45) Date of Patent: *Jan. 7, 2025

(54) SYSTEMS, METHODS, AND STORAGE MEDIA FOR MANAGING DIGITAL LIQUIDITY TOKENS IN A DISTRIBUTED LEDGER PLATFORM

(71) Applicant: SECURRENCY, INC., Durham, NC (US)

(72) Inventor: George Daniel Doney, Riva, MD (US)

(73) Assignee: DTCC DIGITAL (US) INC., Jersey City, NJ (US)

( * ) Notice: Subject to any disclaimer, the term of this patent is extended or adjusted under 35 U.S.C. 154(b) by 228 days.

This patent is subject to a terminal disclaimer.

(21) Appl. No.: 17/869,884

(22) Filed: Jul. 21, 2022

(65) Prior Publication Data
US 2022/0374990 A1 Nov. 24, 2022

Related U.S. Application Data

(63) Continuation of application No. 16/861,769, filed on Apr. 29, 2020, now Pat. No. 11,430,066, which is a continuation-in-part of application No. 16/851,184, filed on Apr. 17, 2020, now abandoned.

(60) Provisional application No. 62/839,969, filed on Apr. 29, 2019.

(51) Int. Cl.
G06Q 40/06 (2012.01)
G06Q 20/36 (2012.01)

(52) U.S. Cl.
CPC .......... *G06Q 40/06* (2013.01); *G06Q 20/367* (2013.01)

(58) Field of Classification Search
CPC .. G06Q 40/06; G06Q 20/367; G06Q 2220/00; G06Q 20/02; G06Q 20/065; G06Q 20/223; G06Q 20/3678; G06Q 20/3825; G06Q 20/3827; G06Q 20/3829; G06Q 20/389; G06Q 20/405
See application file for complete search history.

(56) References Cited

U.S. PATENT DOCUMENTS

| | | |
|---|---|---|
| 10,193,696 B2 | 1/2019 | Struttmann et al. |
| 11,194,837 B2 | 12/2021 | Vo et al. |
| 11,301,460 B2 | 4/2022 | Rich et al. |

(Continued)

OTHER PUBLICATIONS

"Wrapped Tokens. A multi-institutional framework for tokenizing any asset." Whitepaper v0.2, https://wbtc.network/assets/wrapped-tokens-whitepaper.pdf (Jan. 24, 2019). (Year: 2019).*

(Continued)

*Primary Examiner* — Elizabeth H Rosen
(74) *Attorney, Agent, or Firm* — NEO IP

(57) ABSTRACT

An apparatus, computer-readable medium, and computer-implemented method for creating and managing a distributed ledger non-fungible token data structures that represent the liquidity function for any two distinct representations of assets. The representations may be different assets or a single asset type with different characteristics including ledger, network, jurisdiction, availability, etc. The liquidity function is the mechanism to transform or exchange the asset including the pricing function, fees, and delivery mechanism. The investment performance of the liquidity token can be proportional to the demand for liquidity for the pair of assets.

19 Claims, 28 Drawing Sheets

(56) References Cited

U.S. PATENT DOCUMENTS

| | | |
|---|---|---|
| 11,488,147 B2 | 11/2022 | Sheng et al. |
| 11,488,161 B2 | 11/2022 | Soundararajan et al. |
| 11,551,191 B2 | 1/2023 | McNamara et al. |
| 2012/0303425 A1 | 11/2012 | Katzin et al. |
| 2014/0129457 A1 | 5/2014 | Peeler |
| 2015/0026049 A1 | 1/2015 | Theurer et al. |
| 2015/0081589 A1* | 3/2015 | RovelleQuartz ....... G06Q 40/06 705/36 R |
| 2017/0085545 A1 | 3/2017 | Lohe et al. |
| 2017/0091756 A1 | 3/2017 | Stern et al. |
| 2017/0103385 A1 | 4/2017 | Wilson, Jr. et al. |
| 2017/0109735 A1 | 4/2017 | Sheng et al. |
| 2017/0213289 A1* | 7/2017 | Doney ................ G06Q 40/03 |
| 2017/0221052 A1 | 8/2017 | Sheng et al. |
| 2018/0189756 A1 | 7/2018 | Purves et al. |
| 2019/0028276 A1 | 1/2019 | Pierce et al. |
| 2019/0080404 A1 | 3/2019 | Molinari et al. |
| 2019/0287175 A1* | 9/2019 | Hill ....................... G06Q 40/04 |
| 2020/0089672 A1 | 3/2020 | Velisetti et al. |
| 2020/0258153 A1 | 8/2020 | Tilfors |
| 2020/0349562 A1 | 11/2020 | Madhuram et al. |
| 2021/0042735 A1 | 2/2021 | Majidi et al. |
| 2021/0097530 A1 | 4/2021 | Chang |
| 2021/0192501 A1 | 6/2021 | McNamara et al. |
| 2022/0006705 A1 | 1/2022 | Padmanabhan |
| 2022/0270080 A1 | 8/2022 | Yantis et al. |

OTHER PUBLICATIONS

International Searching Authority; International Search Report and Written Opinion for PCT Application No. PCT/US20/28625 mailed Jul. 17, 2020.

International Searching Authority; International Search Report and Written Opinion for PCT Application No. PCT/US20/30446 mailed Jul. 27, 2020.

Konings, Herwig, "Security Tokens Explained in 4 Layers; A Guide for Investors and Issuers," Security Token Market Blog, https://blog.stomarket.com/security-tokens-explained-in-4-layers-a-guide-for-investors-and-issuers-a58b53a8da30?gi=9bde01c298e8 (Nov. 27, 2018) (Year: 2018).

* cited by examiner

SYSTEMS, METHODS, AND STORAGE MEDIA FOR MANAGING DIGITAL LIQUIDITY TOKENS IN A DISTRIBUTED LEDGER PLATFORM

RELATED APPLICATION DATA

This application is a continuation of U.S. application Ser. No. 16/861,769 filed on Apr. 29, 2020, which is a CIP of U.S. application Ser. No. 16/851,184 filed on Apr. 17, 2020. This application claims benefit to non-provisional application of U.S. provisional application Ser. No. 62/839,969 filed on Apr. 29, 2019, the disclosure of which is incorporated herein by reference.

FIELD OF THE DISCLOSURE

The present disclosure relates to systems, methods, and storage media for configuring a system for managing data relating to tokenized assets.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

In economics "liquidity" refers to the degree to which an asset can be quickly bought or sold in the market without affecting the asset's price. Liquidity may also be described as the efficiency with which the value of one asset may be transferred/translated to another without loss. At its core, liquidity focuses on the "dual coincidence of wants", that is, the likelihood that a market includes both a consumer and provider of an asset with a simultaneous desire to transact. In the absence of a dual coincidence, the seller (or buyer) must aggressively adjust price to find a willing party to engage in the desired transaction. The extent to which the price must be adjusted against the price in which an individual engaging in the reverse transaction would pay reflects the efficiency of the market. A market which requires a significant price shift to support the desired transaction is inefficient and can be said to have limited liquidity. Markets are said to have efficient liquidity and pricing ricing if for any given transaction the difference in the price for an equivalent purchase or sale of the value is similar. Many markets are not liquid and do not have efficient pricing. Entering these markets can be difficult as investors must pay a premium to join.

Applicant has developed a novel and useful technology to enhance and automate the management of liquidity within an ecosystem via the use of Distributed Ledger Technology (DLT) and tokenization. Distributed Ledger Technology (DLT), such as blockchain, has been implemented to transfer value across decentralized computer networks, with fungible and non-fungible assets represented by, and encapsulated in, digital tokens. Transactions are recorded to the ledger based on confirmation accomplished through a consensus mechanism. DLT has the potential to increase market efficiencies. However, adapting many market activities to a decentralized network without central trusted intermediaries has raised many technical obstacles. For example, without a centralized market maker, liquidity can be lost.

SUMMARY

Disclosed implementations include digital "liquidity tokens" that define novel composable asset classes to capital markets and a novel technology platform to create efficient networked trading systems by efficiently maximizing liquidity. The resulting system smooths the mismatch in markets of buy and sell participation, by ensuring that: 1) there is always a market price; 2) a buy or sell move into or out of a market is always possible, however small; 3) price moves reflect the demand for liquidity itself; 4) moves into and out of a market incur minimum friction; 5) attempts to manipulate a market result in a loss of value; 6) information mismatches result in minimum value leakage from the system; and, 7) liquidity providers have an opportunity to benefit from the demand for liquidity in a market.

Holders of liquidity tokens receive value (e.g., dividends, equity growth) based on the demand for liquidity in a particular market. The tokens, themselves, represent an ownership stake in a market-making function between value pairs. The greater the demand for liquidity, the larger the revenue. An increase in revenue, in turn attracts more capital to the token. An internal balancing function maintains equilibrium between asset flow and market demand. Through an ecosystem of liquidity tokens (each representing the demand for liquidity of a specific pair), capital will flow to balance the demand for liquidity among all asset classes in the ecosystem.

Implementations provide a technology platform that leverages composable tokenized assets to deliver and manage market liquidity. By isolating liquidity functions at their core, applicant's technology establishes a foundational infrastructure for liquidity services that can be applied across financial services.

One aspect of the disclosed implementations is a method for creating a tokenized pairs of assets, the method comprising: creating a liquidity token, wherein the liquidity is a digital token representing a liquidity function for an asset pair and beneficial ownership of the revenues produced by the liquidity functions and ownership of the assets required to support liquidity. The liquidity token can be created as a non-fungible token in accordance with a class definition, and wherein the liquidity token included a unique token identifier and the liquidity token can be wrapped with a digital fungible token by assigning ownership of the liquidity token to the fungible token to thereby create a data structure that permits fractional ownership of the assets and revenue represented by the liquidity token. The liquidity token can be assigned to a smart contract wallet to support liquidity functions and asset management.

Another aspect of the disclosed implementations is a method for creating a tokenized pairs of assets, the method comprising: creating a digital token for each side of an asset pair in accordance with a class definition, each digital token including a unique token identifier; registering the digital tokens in association with the corresponding asset as a unique record in a memory device of an asset registry; assigning ownership of each of the digital tokens to a respective wallet that is owned by a non-fungible token; and wrapping the non-fungible token with a fungible token by assigning ownership of the non-fungible token to a wallet associated with the fungible token to thereby create a data structure that represents revenue generated by providing liquidity between the assets of the asset pair.

Another aspect of the disclosed implementations is a data structure representing a tokenized pairs of assets, the data structure being recorded on non-transient media and comprising: a digital token for each side of an asset pair, wherein each digital token is created in accordance with a class definition, and wherein each digital token includes a unique token identifier that is registered in association with the corresponding asset as a unique record in a memory device of an asset registry; wherein ownership of each of the digital tokens is assigned to a respective wallet that is owned by a non-fungible digital token; and wherein a fungible digital token wraps the non-fungible digital token through an ownership assignment of the non-fungible token to a wallet associated with the fungible token to thereby create a data structure that represents revenue generated by providing liquidity between the assets of the asset pair.

DETAILED DESCRIPTION

Figure 1:
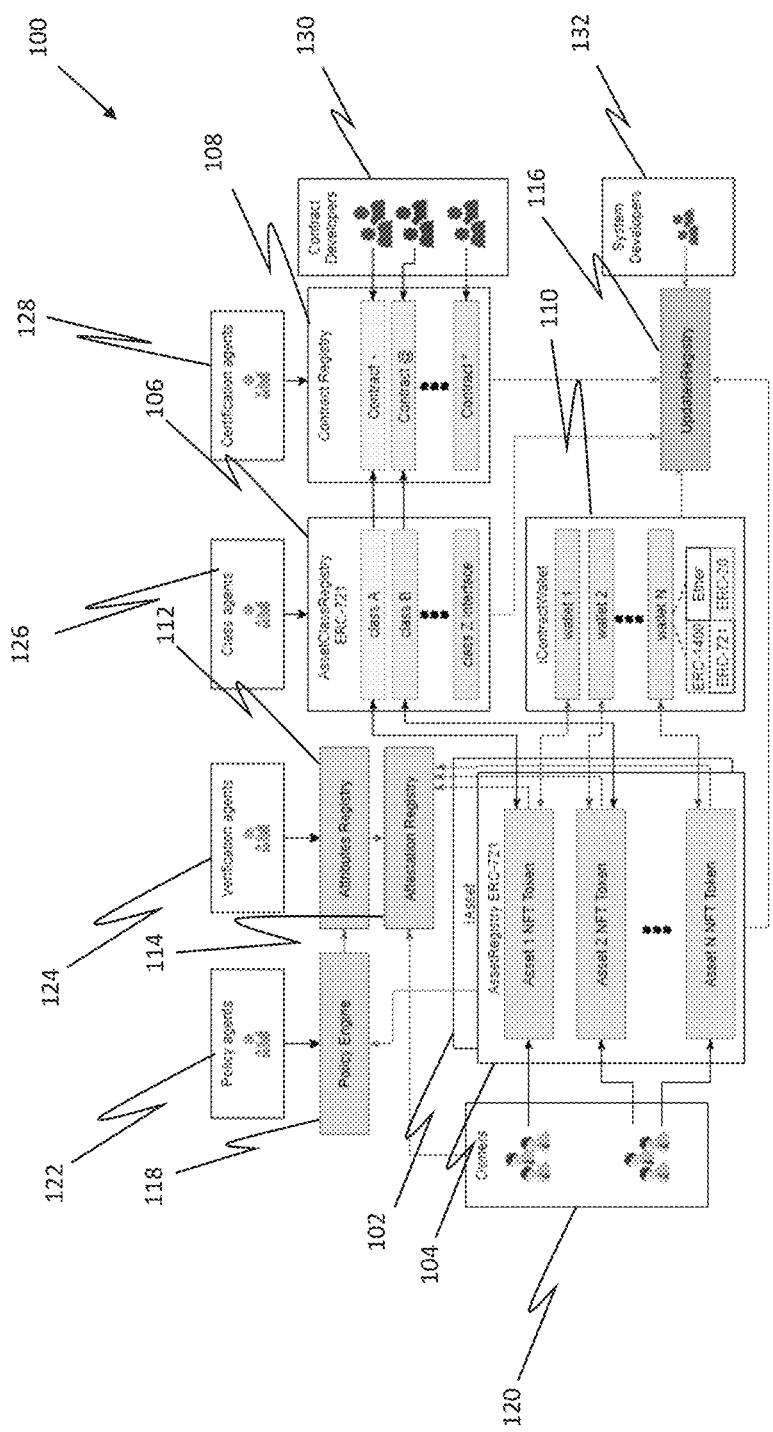
FIG. 1 is a schematic diagram of a computing architecture for creating, configuring, and managing tokenized assets in accordance with disclosed implementations.

FIG. 1. illustrates computer architecture 100 for tokenizing and managing assets in accordance with disclosed implementations. In some implementations, architecture 100 may include one or more computing platforms that may be configured to communicate with one or more remote computing platforms according to a client/server architecture, peer-to-peer architecture and/or other architectures. The platforms may be configured by machine-readable instructions which may include one or more instruction modules. The instruction modules may include computer program modules stored in non-transient memory.

An investment fund, such as an ETF, is used herein as an example of an asset that can be managed with the disclosed implementations. To create and launch an ETF fund in accordance with disclosed implementations, issuers follow a multistep process including: (1) tokenizing fund assets using predefined specification (referred to as an "IAssetToken" specification herein) of IAsset module 102 (described in detail below); (2) tokenizing the fund itself using with a predefined specification (referred to as an "IAssetFund" specification herein) of IAsset module 102 (described in detail below); (3) using a novel token data structure enabling asset management, enumeration, and nesting, attach tokenized assets to the fund using an AddAssetRequest function (described in detail below); and (4), if desired, attach a non-fungible token to a fungible token using an IAssetManagementFungible interface (described in detail below) of IAsset module 102 (described in detail below) to support fractional ownership and simplified transactions. Note that the tokens of the disclosed implementations are sometimes referred to as "IAsset tokens" herein. All of these specifications, interfaces, process steps and data structures facilitate fund management in decentralized systems and are described in detail herein. Examples of source code implementing the various functions and interfaces is included in the Appendix which is a part of the specification of this patent application.

Asset registry module 104 includes a smart contract, AssetRegistry, that issues and tracks tokens representing assets. These tokens implement interfaces to manage relationships between assets and expose basic asset functions, such as valuation functions. Assets may be assigned a class that can be tracked in AssetClassRegistry module 106. The term "class", as used herein, is well known in the field of object oriented programming and can refer to a "blueprint" for creating objects (a particular data structure), providing initial values for state (member variables or attributes), and implementations of behavior (member functions or methods).

An asset class assignment enables the token to expose properties and functions specific to that class. ContractRegistry module 108 enables developers to publish new interfaces and implementations to enhance or extend, e.g. upgrade) the behavior of all assets in a class. IContractWallet module 110 implements and manages smart contract-based cryptographic wallets that can be attached to individual token representing assets, classes, or other elements providing wallet functionality via that asset. AttributesRegistry module 112, AttestationRegistry module 114, Updates-Registry module 116, and PolicyEngine module 118 are used by assets (and other services) in the manner described below.

Figure 2:
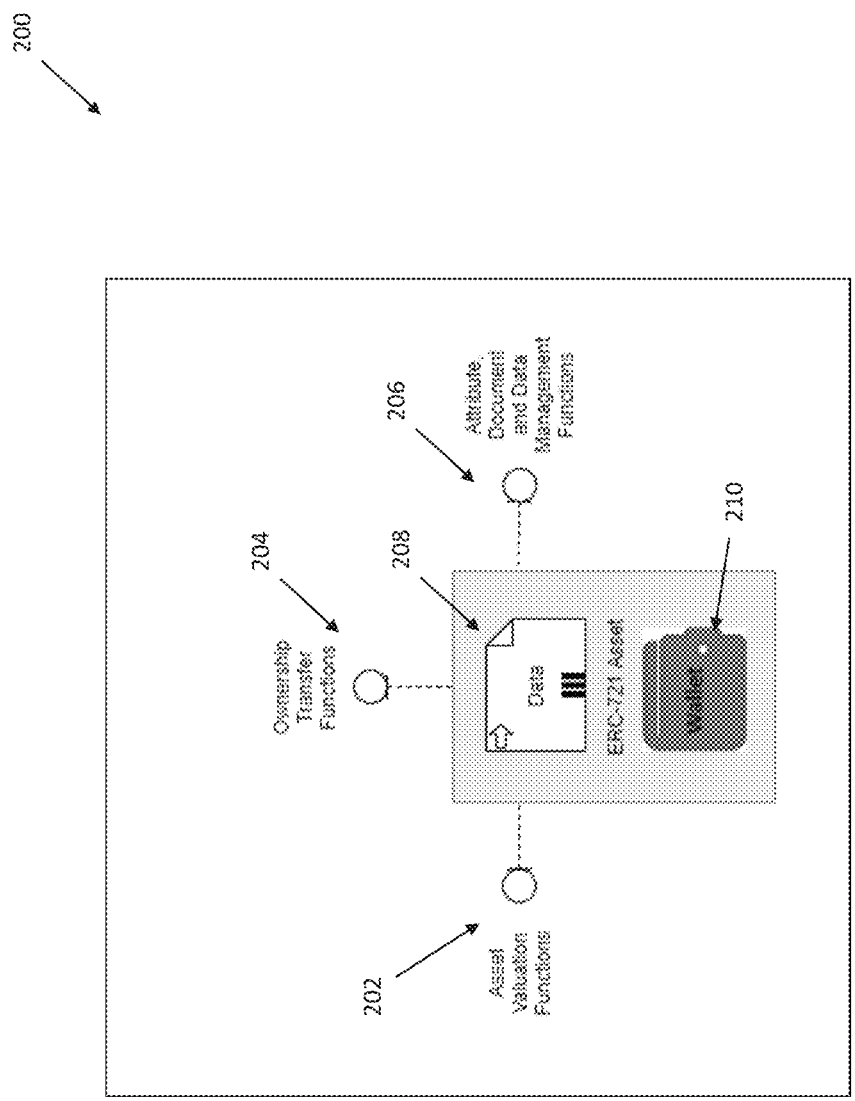
FIG. 2 is a schematic illustration of the basic non-fungible asset token and its high level interfaces in accordance with disclosed implementations.

On issuance of a token, an AssetRegistry smart contract of AssetRegistry module 104 assigns an asset class to the token and deploys a new smart contract implementing the IContractWallet interface to thereby associate a wallet with the token. As a result, each created token will have a unique wallet address (as shown in FIG. 2) linked to the token by its identifier and may implement properties and functions of an assigned asset class. AssetRegistry module 104 operates the IWalletContract interface and enforces policy for actions regarding the wallet. Typically, the policy will only allow the owner of the token to execute actions via the wallet contract. The wallet will support functionality for transfer or receipt of tokens and, optionally, cryptocurrency such as Ether (ETH). Wallets can support tokens compatible with ERC-20, ERC-721, ERC-1400, and other standard interface tokens.

The smart contracts, implemented by IContractWallet module 110 operates wallets and will support upgradability via UpdatesRegistry module 116 (like all other system components). This structure allows registration of new wallet smart contracts implementing changed or upgraded behavior. The token owner, or other designee, may choose to assign a new wallet contract to the token to implement the upgraded functions or may reject such an assignment in some cases. ContractRegistry module 108 stores smart contract interfaces that provide customized functions for an AssetClass (from AssetClass registry module 106) or Asset instance (from AssetRegistry module 104). Each token may be assigned a class which provides access to the attributes, functions and implementation logic of the class. The Asset or AssetClass owner (or designee) can select an implementation from the interface registry. Developers can submit new Smart Contracts with custom implementations to ContractRegistry module 108 for owners to select in order to expose the custom logic for their asset.

A smart contract can be deployed on a distributed ledger that implements AssetRegistry module 104 to enable issuance of non-fungible tokens representing individual assets. The physical deployment of the smart contract implementing AssetRegistry module 104 is not described in detail herein as such deployment can use conventional techniques that are well understood by those of ordinary skill in the art.

Token Owner modules 120 are associated with systems of parties who exercise control over assets (represented by, for example, non-fungible tokens) in Asset Registry 104. This control may be exercised via wallets directly or indirectly through rights allocated via fungible or non-fungible tokens that have control authority over the asset.

Policy Agent modules 122 are associated with systems of parties with the authority to publish policy that govern token behavior. The Token Owner may designate a published policy to govern specific actions performed on or through the token. Details on Policy Enforcement are disclosed in the Compliance Aware Token disclosure. Verification Agent modules 124 are associated with systems of parties that create attributes, that is characteristics or properties of objects in the system. Verification Agents have the ability to attest to attribute values associated with objects. For example, a legal firm may serve as the Verification Agent that a fund asset is a 1940 Act fund for the purposes of regulatory policy enforcement. Class Agent modules 126 are associated with systems of parties who exercise control over Asset Class tokens. Using this control, the Class Agents may select attributes and interfaces that apply to all asset tokens that are associated with the class. Certification Agent modules 128 are associated with systems of parties who certify that smart contract code published by Contract Developers performs the function as described, are secure, and are free from defect. Contract Developer modules 130 are associated with systems of parties that develop smart contract code to be used by asset tokens to perform functions associated with the asset class. These functions may be added, upgraded, or removed by a Class Agent once certified by a Certification Agent. System Developer modules 132 are associated with systems of parties authorized to publish updates to core elements of the system such as the Asset Registry modue 2204 or Contract Wallet module 110.

It should be appreciated that the modules disclosed herein can be implemented within a single processing unit or multiple processing units, one or more of the modules may be implemented remotely from the other modules. The description of the functionality provided by the different modules is for illustrative purposes, and is not intended to be limiting, as any of modules may provide more or less functionality than is described. For example, one or more of modules may be eliminated, and some or all of its functionality may be provided by other ones of modules.

FIG. 2 is a schematic representation of a token data record (the token and related data structures) 200 in accordance with disclosed implementations. Asset Registry 104 can implement, for example, the Ethereum Request for Comment (ERC 721) standard interface (or equivalent on other distributed ledgers) to enable the issuance of non-fungible tokens. (See, e.g., https://github.com/ethereum/EIPs/blob/master/EIPS/eip-721.md). Additionally, Asset Registry 104 implements the novel interfaces described herein that facilitate functions for asset management in decentralized environments such as distributed ledgers. The functions can include asset valuation functions 202, ownership transfer functions 204 and data management functions 206. These interfaces and associated data structure(s), described in detail in below, permit the creation of composite tokens, that is, tokens that contain or are linked to other tokens, in a structure that can be recursive. This novel structure is described in greater detail below and permits implementation of a fund, a composite asset that contains other assets, over a decentralized computer architecture.

Consistent with the ERC-721 token specification, Asset Registry module 104 facilitates the issuance of non-fungible tokens, with each token representing a unique asset. For each issued token, Asset Registry module 104 records data 208 such as: the unique identifier for the asset token; the asset class from Asset Class Registry module 106; the asset name and description; the address of the token's wallet 210 (described below); and other data as desired for the asset. The token data record 200 stored by Asset Registry module 104 defines the non-fungible token. The token may be assigned additional attributes and values using the methods disclosed in in US Published Patent Application No. US20190164151 A1. The digital tokens can implement the IAsset interface of IAsset interface module 102, exposing a set of functions, such as functions 202, 204, and 206, that facilitate asset management over a decentralized computing platform in the manner described below. Using data structure 200, any asset of value may be "tokenized", that is, issued as a unique record on a distributed ledger reflecting the asset's ownership and coupled with supporting essential asset management functions needed to support scalable operations, such as fund operations. As described in detail below, IAsset interface module 102, supports specific functions that enable an asset to: present consistent data and valuation information; participate in funds and other asset management structures; implement asset specific logic; and/or encapsulate other tokens representing value instruments that are not created with native asset management capabilities.

As noted above and shown in FIGS. 2 and 3, a token 200 is associated with a cryptographic wallet 210. Disclosed implementations include an interface specification and data structure enabling a smart contract and/or a discrete token to be associated with, i.e. to own, a cryptographic wallet. This novel structure makes it possible for a token to own other tokens and add or remove other tokens from its ownership and to conduct transactions with other entities by interacting with wallets 211 corresponding to other tokens or entities. A token that owns a corresponding wallet containing other tokens, thereby representing a token-in-token structure, is referred to as a "composite token" herein.

Non-fungible tokens in the Asset Registry are assigned a wallet 210 (FIG. 2) on issuance by the asset registry 104 by implementing the IAssetRegistry.IssueAsset function using an IAssetWalletFactory interface (see Appendix for code example). This interface issues a smart contract implementing an IContractWallet interface which is stored in Contract Registry 108 in association with the unique token ID. An example of code implementing this interface can be found in the Appendix.

The wallet contract's interfaces can be executed using the IAssetWallet wrapper, that is, the set of functions conforming to the IAssetWallet interface specification published in the appendix that are available via the AssetRegistry smart contract for use by the owner of the IAsset token or other permission structures as implemented in the smart contract logic. If the signer is not authorized to execute the function as designated by Asset Registry 104, implemented as smart contract logic for example, the proposed operation (e.g., "send tokens") will not be permitted and thus will not occur. The IAssetWallet exposes its wallet address via the GetWallet function of the attached code. This address can be used as an origin or destination for transactions in the same way as any wallet on the distributed ledger.

Linking a wallet to a token in this structure enables useful effects such as: full traceability of the actions performed on behalf of the asset corresponding to the token, the ability to automate actions through an asset management smart contract that trades based on a strategy, the ability to conduct transactions with an asset's wallet as if transacting with an entity, the ability to insert robust policies (such as those disclosed in US Published Patent Application No. US20190164151 A1) into asset operations including operations via the asset wallet.

Figure 3:
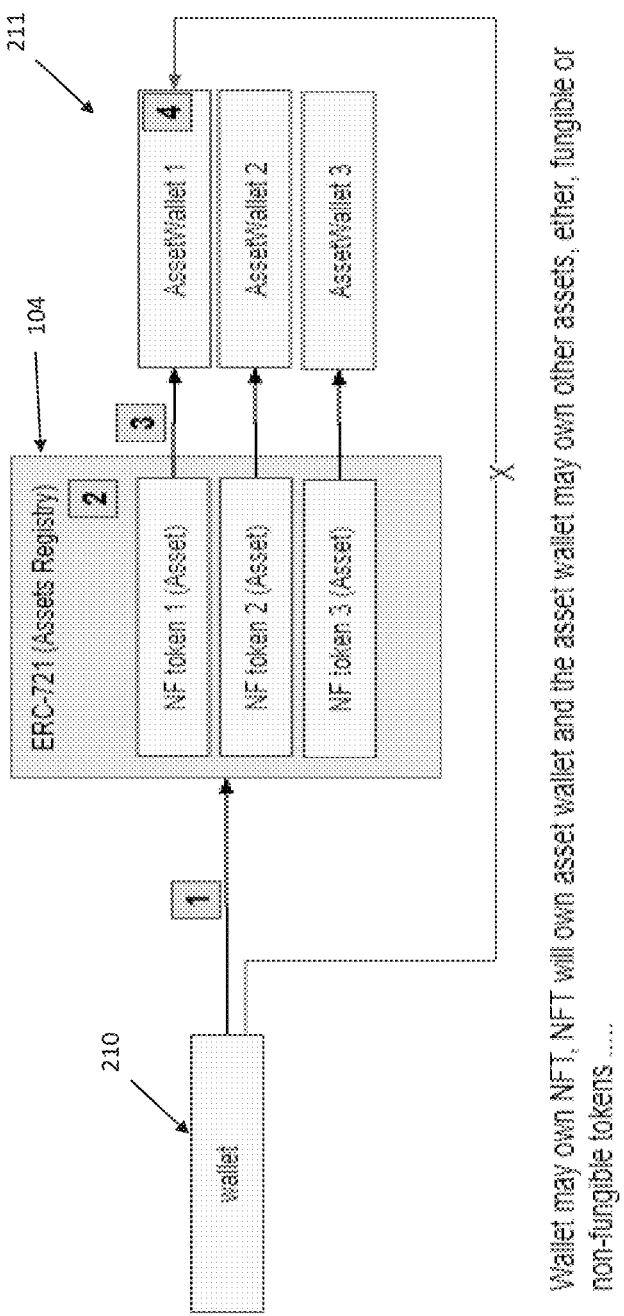
FIG. 3 illustrates the process flow of asset token sales and purchases in accordance with disclosed implementations.

As shown in FIG. 3, the "token-in-token" structure, in which wallets corresponding to tokens can own other tokens, enables the creation of tokenized composite assets. One type of composite asset is a fund, a financial asset that contains other assets. When issued as an IAsset token supporting the IAssetManagement interfaces, the token supports asset management transactions enabling the execution of a fund management strategy manually by a fund manager or automatically via a smart contract based algorithm on a distributed ledger. Using this model, composite assets can be tokenized and can contain, add, or remove assets like cryptocurrencies, other asset tokens (simple or composite), or tokenized shares of assets.

Further, the token-in-token structure can be used to "wrap" third party tokens that do not support asset management with the IAsset token interface, to be managed in fund structures as individual assets. Wrapping a third party token can be accomplished through a simple transfer to the IAsset token's wallet. This will allow any token or smart contract to be wrapped and processed as an asset exposing a consistent structure for automated asset management and fund operation. With these technical elements in place, it is possible to quickly launch complex self-processing funds. For example, in and ETF structure, one or more non-fungible tokens representing individual assets can be issued via the Asset Registry module 104 using the IAssetRegistry.IssueAsset function (see example code in Appendix). Each token implements the IAsset interface which extends the basic ERC 721 specification with ownership transfer functions implemented via the IAssetTransferable interfaces to support asset management, enhance transparency, and support purchase and sale of the asset in a marketplace.

Figure 4:
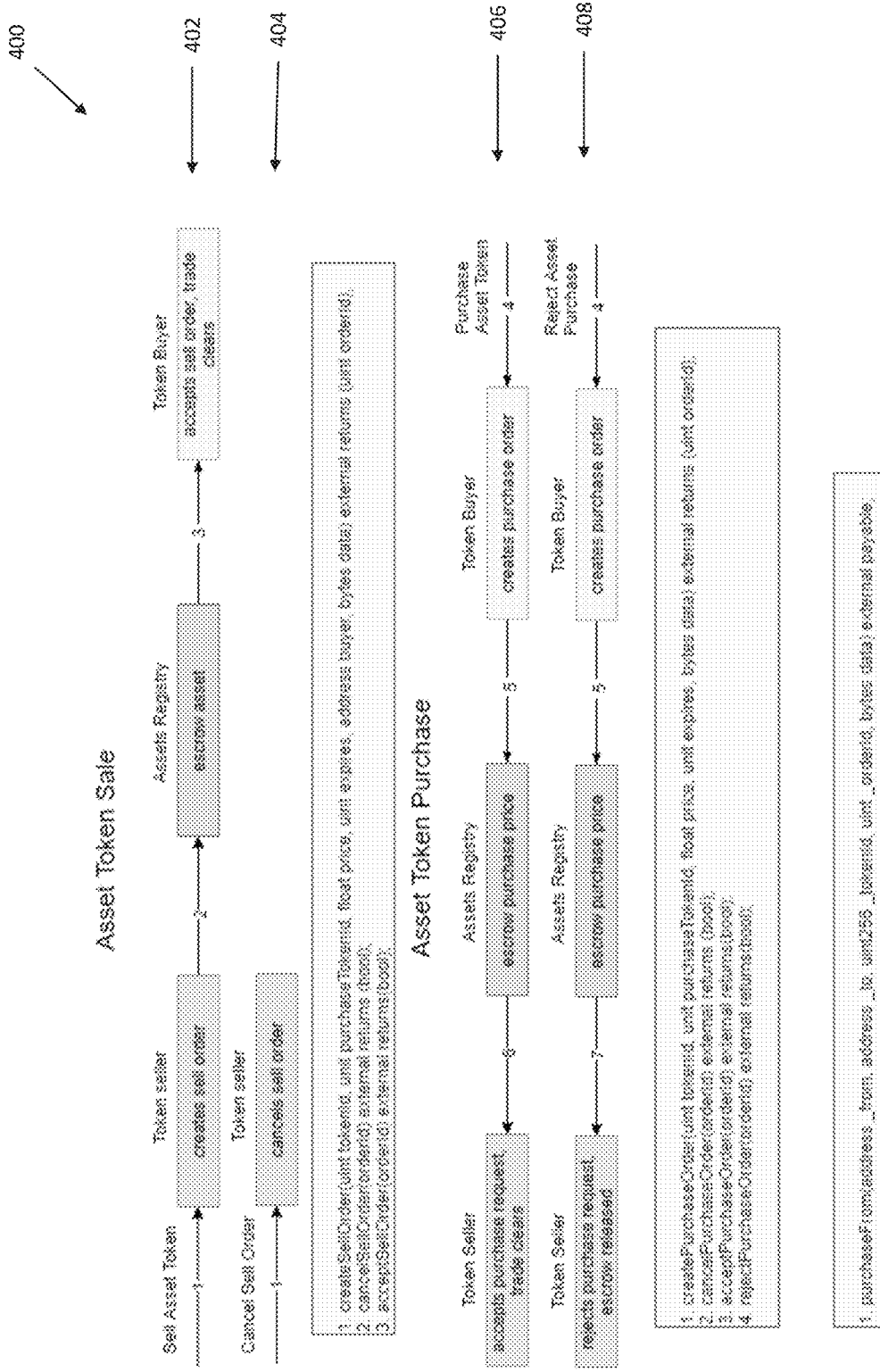
FIG. 4 illustrates the interface specifications for asset valuation functions in accordance with disclosed implementations.

FIG. 4 schematically illustrates process flows 400 of asset ownerships transfer functions (shown as 204 in FIG. 2). As noted above, tokens can implement the ERC 721 standard interfaces, which include conventional ownership and transfer functions defined in the ERC 721 specification. The tokens can also implement the compliance aware framework disclosed in US Published Patent Application No. US20190164151 A1. Implementations disclosed herein extend this framework with functions to enable systematic asset purchase, sale and linking.

As shown at 402 in FIG. 4, a sell order for a token can be created with the createSellOrder function that operates on a data structure including the parameters (uint tokenid. unit purchase Tokenid, float price, uint expires, address buyer, bytes data) external returns (uint orderId). A cancelSellOrder function operates on the order id and returns a Boolean. Assuming that the the cancelSellOrder function returns FALSE, the token buyer accepts the sell order and an acceptSellOrder function is executed. As shown at 404, if the cancelSellOrder function returns TRUE, i.e. the sell order has been cancelled, the order process is terminated with a sale.

For a token purchase, as shown at 406, a createPurchaseOrder function is executed on a data structure including the parameters (uint tokenid, unit purcllaseTokenid, float price, unit expires, bytes data) and returns the order identification as an order ID in the form of (uint orderid). A cancelPurchaseOrder function is executed on the parameter (ordertd)

and returns a Boolean. If the return is FALSE, the purchase can be accepted by execution the acceptPurchaseOrder function on the parameter (orderid) and the purchase is cleared. Alternatively, as shown at 408, the purchase is rejected by executing the rejectPurchaseOrder function on the parameter (orderid). As an alternative approach, the sell order may be executed by making a payment to the Asset Registry wallet including the orderID in the payload by executing the purchaseFrom function on a data structure including the parameters (address_irom, address_to, uint256_tokenId, uint_orderId, bytes data).

As noted above, transactions between tokens are accomplished by virtue of the wallets associated with the respective tokens. A token's wallet address may be obtained via the IAssetWallet.GetWallet interface which can be implemented by executing the code in the Appendix for example. Distribution logic may be initiated internally by the asset or externally using the interface.

An important aspect of transparency in financial markets is the ability of investors and prospective investors to view metadata, documents, and supporting data feeds for an asset. This information provides investors the means to develop their own sense for fair market price as well as providing a mechanism to assess the performance of intermediaries, like the asset manager, tasked with the responsibility to assess price in the market. Conventionally, such information has to be collated in a static manner and thus time-based reporting of the data is not pragmatic in prior art systems. Disclosed implementations include a comprehensive data structure for asset due diligence to provide scalable transparency; a function missing from the RMBS portfolios and other complex assets of the prior art.

Transparency requires the ability to create, maintain, and inspect asset properties or attributes. Since asset types vary widely, it follows that asset attributes vary even more broadly. To support data analysis across a broad range of assets, a consistent framework is required to manage any property of any asset as attested by any authorized party. An implementation includes the Attribute Management (ERC 1616) specification (https://eips.ethereum.org/EIPS/eip-1616) as a basic mechanism to manage asset properties. The disclosed implementations can also extend this specification via the Compliance Aware Token framework (see US Published Patent Application No. US20190164151 A1) to include scalable trust attestations and policy enforcement based on these attributes.

Additionally, asset due diligence often requires document and data management. distributed ledgers provide specific advantages for document management in that an immutable record can be provided for supporting documentation and data as well as an accessible framework to access this data. An implementation includes the Document Management (ERC 1643) specification (https://github.com/ethereum/EIPs/issues/1643). Disclosed implementations also include a mechanism to tokenize supporting datasets via a non-fungible token that describes the schema and other characteristics of supporting data using a non-fungible token. This specification supports advanced data authorization techniques, including the use of authorization tokens to provide distribution control and auditing of sensitive data. Policy-based data access and management can be achieved using techniques taught in the decentralized access control taught by US Published Patent Application No. US20190164151 A1.

Figure 5:
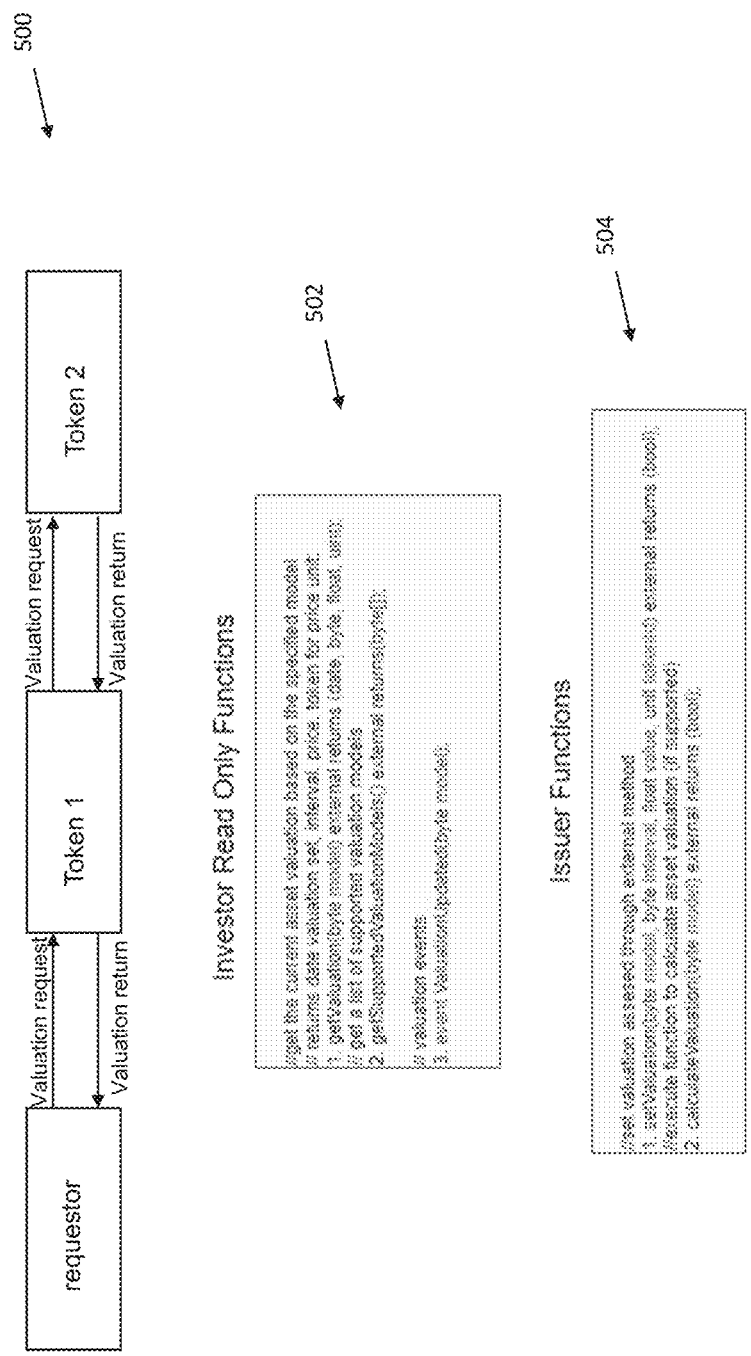
FIG. 5 illustrates the flow of a valuation process in accordance with disclosed implementations.

One the most important fiduciary responsibilities of an asset manager is to assess and publish the valuation of the managed asset. This provides investors a record of the asset manager's understanding of value based on the information available to the manager which, for most assets, exceeds the information that can be obtained by the investor at the time of the assessment. FIG. 5 illustrates an example of a process flow 500, and related data structures, for asset valuation functions of a disclosed implementation. These functions provide a consistent mechanism for publication and access to asset valuations. A common interface for valuation simplifies the integration of analysis tools. It also facilitates valuation of dissimilar assets facilitating the formation of diversified funds. As noted above, asset tokens expose valuation interfaces to enable investors to see current assessments of the asset's value. A range of known accounting techniques can be used to assess asset value. The technique used will be specified in the valueType attribute field for the asset. Asset tokens can have internal logic to support the value assessments. The Asset Valuation function can be implemented by executing the code example in the Appendix.

As shown in FIG. 5, a requestor (such as an investor), can make a getValuation request to a token 1 and a valuation of token 1 will be returned by token 1. The request can include the valuation model to be applied. If necessary, a getSupportedValuationModels request can be made to ascertain which valuation models are supported by token 1. The logic to generate asset valuation can vary across implementations and asset classes.

In one implementation, valuations can be published as attestations, that is attribute values assigned with full attribution by a validated party, by the asset owner, manager, or other authorized parties. In other implementations, the valuation data is generated by smart contract code in Asset Registry module 104 (FIG. 1) or as assigned to the class in Asset Class Registry module 106 (FIG. 1). This logic can use real time attributes of the asset to assess value, "oracles" to reach external sources of data such as exchange pricing, or other sources. For example, for an asset token representing a loan, the PAR valuation is the outstanding principal of the loan, an attribute (found in Attribute Registry module 112 of FIG. 1) of a loan token. As repayments are processed by the loan, the value assigned to this attribute is changed by the loan processing smart contract resulting in a different value for the attribute. Details regarding Attribute Registry module 112 implementation and mechanisms to set and get associated value are disclosed in US Published Patent Application No. US20190164151 A1.

In one implementation, a request (GetValuation) for the valuation type "PAR" is configured via the AssetRegistry smart contract implementation to point to the "PAR" Value attribute in Attribute Registry module 112 (FIG. 1). This attribute contains the current principal, that is outstanding balance for the loan which is returned in response to the request. Some valuation results may require a complex real time analysis of data in order to generate a valuation. To illustrate a separate mechanism for obtaining a valuation, the loan's NAV calculation may be determined based on discounted cash flows and payment behavior of the loan recipient. Specifically, a valuation request for the valuation type "NAV" may utilize smart contract code assigned to the AttributeClass "Loan" via Contract Registry module 108 (FIG. 1), to calculate the Net Present Value of the loan based on current interest rates, the interest rate of the loan, and the payment history of the borrower based on cash flows that can be observed in the Asset Wallet.

As another example, the "MARKET" value may leverage an oracle, that is a commonly used method to obtain data from sources external to a distributed ledger. As disclosed separately, the Attribute Registry module 112 includes instructions to obtain the latest value, in this case the current exchange price for the asset. Although several examples are provided for clarity, implementations are not limited thereto. However, the means to assign a method to obtain this data that can be configured for each asset provides a novel mechanism to provide "self-reporting assets", that is assets that contain within their data structure the means to calculate and publish their valuation. The method disclosed eliminates the dependency of an auditing or reporting system on specific implementations of the source of valuation data. This eliminates complex system integration required to generate valuations for complex assets, like funds, that contain many different sources of valuation data. Without the disclosed technique, investors often do not have the means to obtain this data. The resulting lack of transparency can have devastating effects as was demonstrated in the 2008 Global Financial Crisis.

The data structures of the requests are shown at 502. Significantly, in the case of composite assets, token 1 may own child tokens and or may serve as a "wrapper" for another token in the manner described above. In such a case, token 1 will have to query all such tokens, token 2 in FIG. 5, in a similar manner for valuation prior to responding to the requestor. As shown at 504, when tokens are issued, a valuation can be set through token issuer functions.

While disclosed implementations expose a common interface for valuation, as noted above, different techniques can be used to calculate the valuation for the range of asset types that will be supported. Unique smart contract logic to calculate valuation for an asset type may be referenced via a known proxy technique, such as that disclosed at (https://hackernoon.com/how-to-make-smart-contracts-upgradable-2612e771d5a2). For example, many assets support a PAR value, that is, its face value. Most managed assets have a Net Asset Value (NAV) calculated based on the market price, liquidity, discounted cash flows, or other assessed value of its contents. If an asset trades regularly, it will have a market price and value. The PAR, NAV, and market values may be different for the same asset. For example, a loan has a PAR value based on the outstanding principal, a NAV based on the discounted cash flows and probability of default, and a market value if it is readily traded or has recently been purchased. Differences in these values can provide insight into changing market perception of asset performance, rating entities, or trust in the asset manager's value assessments.

Asset valuations may be assessed once, periodically, or in continuous near-real time. The data format provides the viewer (for example and owner or other market participant) information to know how stale a value assessment is, and for what interval it is expected to remain valid. Additionally, the specification can provide a link to a standardized feed of valuation history. This provides the reviewer a tool to look at the historical performance of the asset. A link is provided instead of direct access to the data since the storage, search, and indexing tools needed for historical analysis may be different than the tool (a distributed ledger in this implementation) where the asset token is stored.

While the disclosed implementations improve data communication and thus can close the gap between information available to the manager and the investor, flow of data can be controlled by the architecture, at policy engine 118 of FIG. 1 for example, to create a decision gap by design. For example, limitations of data flow relating to certain information may be desirable or in the interest of the investor. For example, the asset manager may want to withhold certain information from general availability to prevent "front running" (the practice of a broker or trader making trades just before a large non-publicized order to gain an economic advantage) or to otherwise protect investment performance or technique. The investor may choose to make a tradeoff between performance and transparency and the asset manager will be driven to disclose based on market demand balanced against the need for confidentiality.

As noted above with respect to FIG. 1, once assets have been tokenized using an IAssetToken interface of IAsset module 102 the next step in developing a fund, such as an ETF self-reporting fund, in accordance with disclosed implementations is the issuance of a fund token using the IAssetFund interface structure of IAsset module 102. This structure extends the IAssetToken structure and functions with the IAssetManagement interfaces. Fund tokens are issued via the IAssetRegistry interface of Asset Class registry module 106 (as with other tokens) but are assigned a type parameter equal to "Fund" by assigning the value for this class from the Asset class Registry module 106. Of course, a fund is an asset that may contain other assets. The same functions available for an individual asset apply to a fund. However, funds extend the basic logic of an IAsset token by providing the functions needed to manage the assets contained within the fund.

Figure 6:
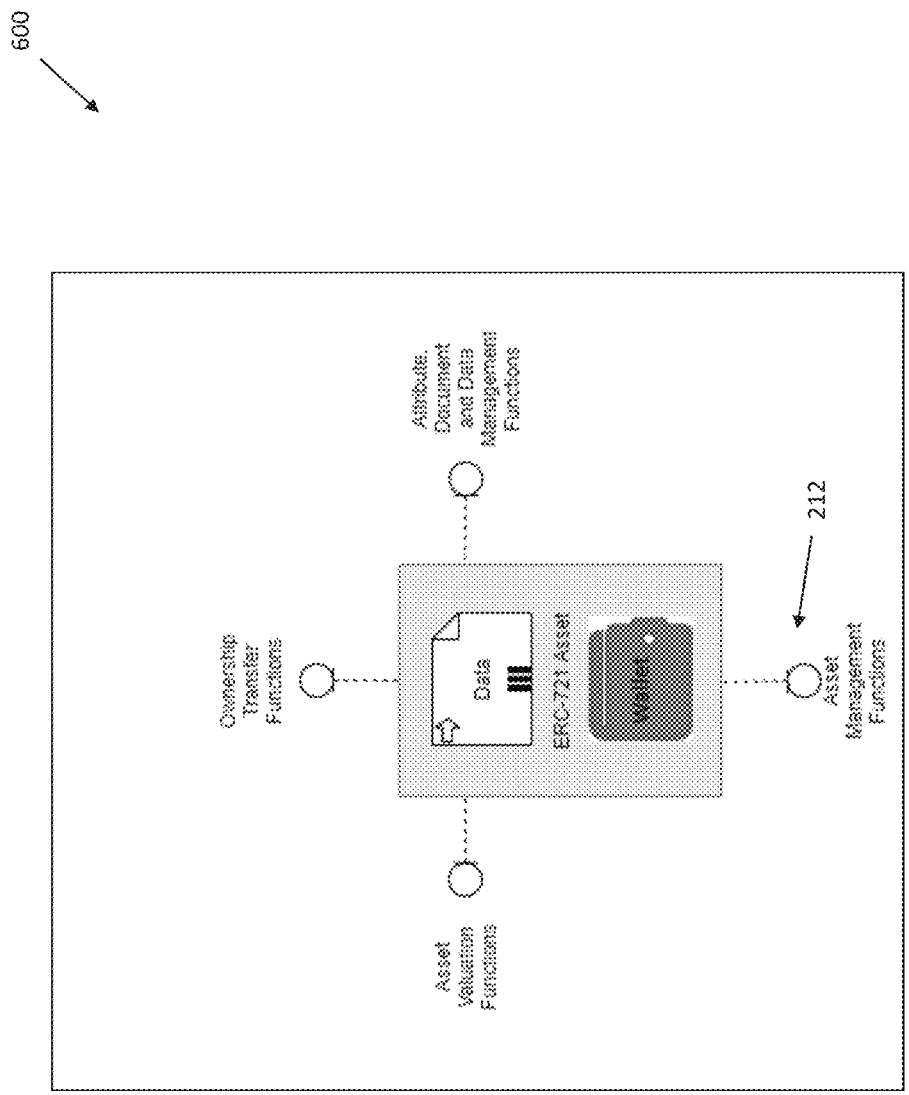
FIG. 6 is a schematic illustration of the basic fund token and its high level interfaces in accordance with disclosed implementations.

As shown in FIG. 6, a fund asset token 600 of disclosed implementations is similar to the asset token 200 of FIG. 2. However, the fund asset management token includes asset management functions 212. Since asset management functions are implemented via the IAssetManagement interface of Asset Registry module 102, are assigned processing smart contract, and utilize the tokens wallet, all transactions can be recorded on a distributed ledger and are immutable. This provides transparency to simplify recordkeeping, auditing, and reporting. Asset management interfaces provide a consistent transaction infrastructure streamlining the development of logic specific to each asset class or fund management strategy. This facilitates the deployment of management strategies for new asset types executed via internal logic that can be replaced, extended, or upgraded without changing the core token structure and interface footprint. Further, this implementation supports a wide range of asset types via common asset management functions is a characteristic of this implementation.

More specifically, the fund token specification of fund token 600 extends the basic asset interfaces permitting authorized entities to enumerate all assets in the fund using the IFundManagement.GetAssets interface. Enumerating assets in the fund, each supporting the IAsset interface enables the viewer to drill into available information for contained assets. For example, the following fund management functions and related data structures can be supported.

addAssetRequest(uint tokened, uint purchaseTokenid, float price, uint expires, bytes data) external returns (uintorderid);
cancelAddAssetRequest(ordered) external returns (bool);
removeAssetRequest(uint tokened, uint purchaseTokenid, float price, uintexpires, address buyer, bytes date) external returns (uint ordered);
cancelRemoveAsstRequest(ordered) external returns (bool);
getAssets( ) external return (uint[ ]); //returns an array of addresses of attached non-fungible tokens
event AssetAdded(uint tokened);
event AssetRemoved(uint tokened)

An example of each function is included in the Appendix. Once a fund token has been issued, the next step in a fund creation process can be to transfer assets to the fund. Note that a fund can include zero to many assets. Assets are purchased or liquidated from the fund using the token's Asset Management Functions, AddAssetRequest & RemoveAssetRequest. As with any token transaction, the asset management actions are recorded on the distributed ledger. These functions are exposed as interfaces by the Asset Registry utilize the IAsset token wallet and the Asset Ownership Transfer functions to execute asset transactions in a manner similar to that described above with respect to token 200 of FIG. 2.

A non-fungible fund token 600 can be coupled with (i.e., "wrapped with") a fungible token, such as token 200 using the IAssetManagementFungible interfaces to facilitate trading and other transactions. Any asset token can be wrapped with a fungible token implementing the IAssetManagementFungible interface to facilitate fractional ownership of the asset and reuse logic for corporate functions built for non-fungible tokens, such as dividend distributions to shareholders, shareholder voting, corporate communications and more. Tokens implementing IAssetManagementFungible structure include new smart contract interfaces (AddAssetRequest, RemoveAssetRequest) that extend the ERC20 standard (Ethereum fungible token). These interfaces enable the fungible token issuer to add or remove one (and only one) asset token to/from the fungible token shell by transferring the non-fungible asset token using the defined functions in the IAssetManagementFungible interface.

The fungible token implementation also includes an interface (IAssetManagementFungible.GetAsset) to permit authorized parties to inspect the asset(s) that underlies the shares represented by the fungible token. The valuation functions exposed by the non-fungible token, which is coupled with the fungible token, permit the shareholder (owner of fungible tokens) to easily calculate their percentage ownership of the underlying assets. For example, if the NAV for an underlying asset is $1,000,000 and a wallet holds 100 of 1000 total shares (10%) in circulation of the that asset, then the total NAV of the fungible tokens in that wallet representing 100 shares is $100,000.

By separating the fungible token from the logic captured in the non-fungible token specific to the asset and its management, the implementation facilitates maximum reuse, and simplifies the development and verification, of asset specific code. Additionally, this approach preserves asset structure to facilitate merger or acquisition approaches where asset acquisition is desired instead of share acquisition for tax, governance, or liability reasons. Asset acquisition is a common technique in finance and, in the absence of the data model and architectures of the disclosed implementation, would not be a pragmatic task. The linked token approach facilitates the transfer of assets to and from exchange traded funds enabling asset liquidity when separate from a parent fund, but convenient management when purchased by a fund for securitization.

Figure 7:
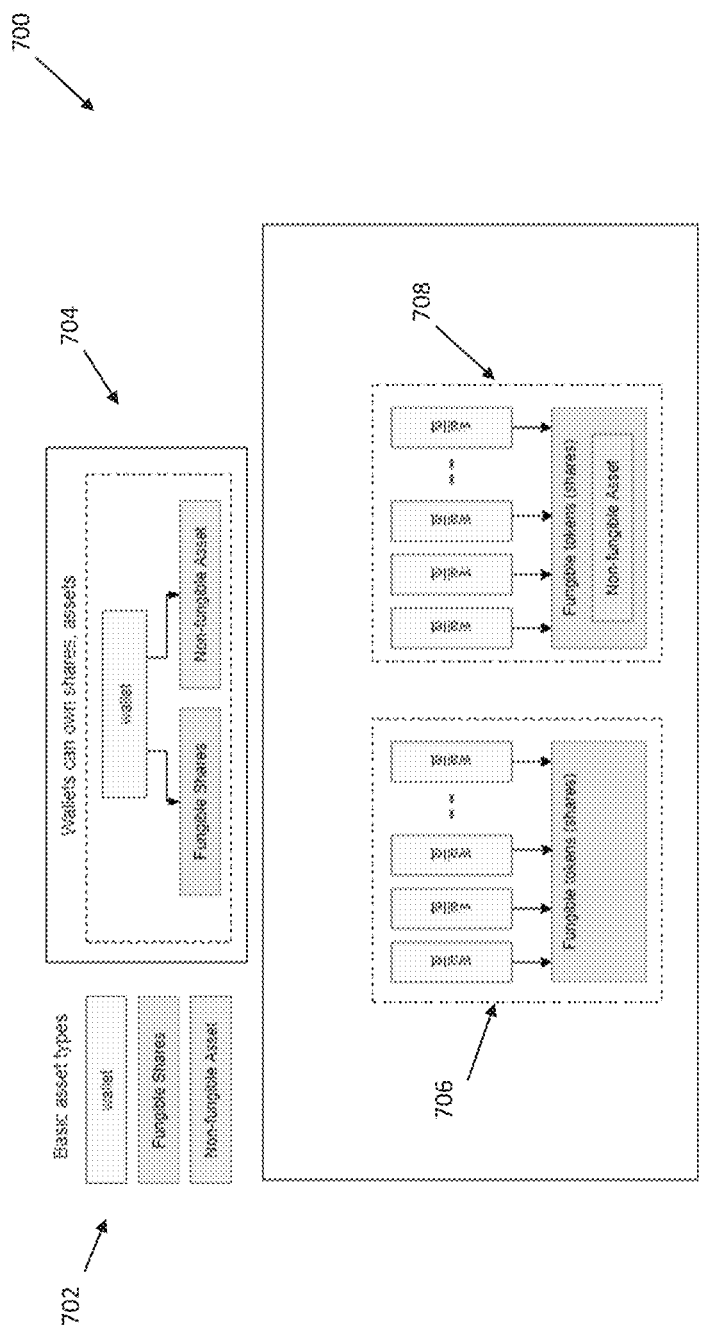
FIG. 7 is a schematic diagram illustrating examples of token wallets owning other tokens in accordance with disclosed implementations.

FIG. 7 is a schematic illustration of the data model 700 for wrapping a non-fungible asset token with a fungible token for transactions to enable, for example, fractional ownership of a fund represented by a fund token. "Fractional ownership" refers to the situation in which a fungible asset can be subdivided so there can be more than one owner of an asset. As shown at 702, the basic token types are "wallet", "fungible share" and "non-fungible asset". As shown at 704, wallets associated with tokens can own other tokens representing fungible shares and/or non-fungible assets through the mechanisms described above with respect to FIG. 1, for example. This simplifies the structure and smart contract code of the asset non-fungible token since it may utilize the dividend distribution and corporate governance function of the non-fungible token wrapper. Shares in a fund are represented by a fungible token and can be owned by one or more wallets or by assets as shown at 706. A smart contract linked to the fungible token exposes ownership and management functions for fungible assets in a fund, as shown at 708. The functions, which are also shown in the Appendix, can include:

addAssetRequest(uint tokenId, uint purchaseTokenId, float price, uint expires, bytes data) external returns (uint orderid);
cancelAddAssetRequest(orderId) external returns (bool);
rernoveAssetRequest(uint toKenId, uint purchaseTokenId, float price, uint expires, address buyer, bytes data) external returns (uint order1d);
cancelRernoveAssetRequest(order1d) external returns (bool);
getAsset( ) external return (uint); //Returns address of attached non-fungible token
event AssetAdded(unit tokenId);
event AssetRernoved(unrt toKenId);

For example, the asset may be a self-processing loan that pays the wallet that owns the asset as loan repayments are received. If this wallet is owned by the fungible token smart contract, these proceeds may be distributed proportionally to the owners of the fungible token. The parent-child token structure also facilitates reuse of established transaction logic and exchange functions in fungible tokens while permitting specialization in asset specific functions, in this case, loan processing. As noted above, a fund can have zero (null) assets as the fund is defined by the fungible token and the linked management smart contract.

Figure 8:
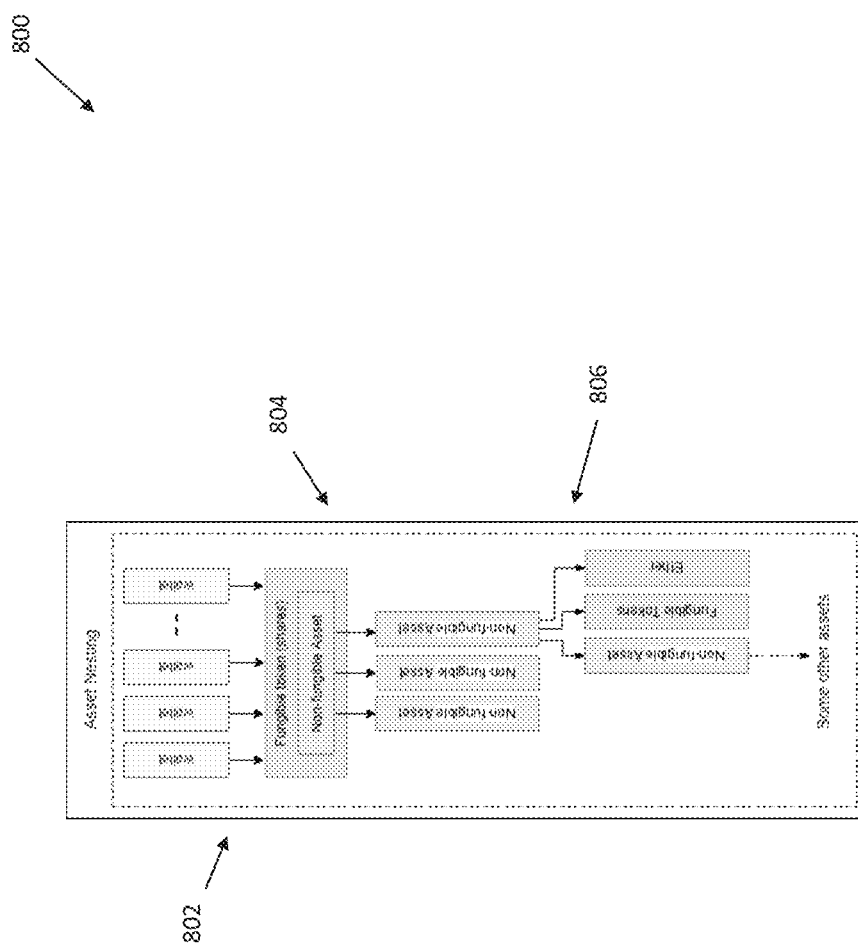
FIG. 8 is a schematic illustration of a connection of a non-fungible asset to a fungible asset token to support fractional ownership is a schematic illustration of the basic non-fungible asset token in accordance with disclosed implementations.

Since an IAssetFund token may contain any of the following: assets, asset tokens for other funds, fungible shares of other assets, or shares of fund assets, the implementation supports nesting of assets as shown in FIG. 8 which is a schematic representation of the data model for such nesting. Nesting facilitates a fund of funds structure and large-scale portfolio diversification techniques. As shown at 802, token wallets can own fungible tokens representing shares in a fund which in turn owns non-fungible assets as shown at 804. Further, as shown at 804, non-fungible tokens (representing a fund for example), fungible tokens, and other assets (such as the cryptocurrency ether in this example) can be owned by the non-fungible tokens. The wallet structure and architecture described above with respect to FIGS. 1, 2, and 6 permit this recursive ownership structure to be represented by a data model that can be used in connection with a decentralized system.

In the same way that IAssetFund extends the IAsset structure to implement Fund management functions, the IAsset structure may be extended for other asset types to permit token polymorphism. For example, an implementation may issue IAssetLoan tokens, that is, IAsset tokens with a class type Loan from Asset Class Registry module 106 of FIG. 1. This class may implement self-processing loans, that is, loans that process payments internally via the IAsset wallet and assigned ProcessWaterfall smart contract logic. Custom smart contracts for payment processing can be assigned to loans by their owner using the AssignWaterfallProcess interface. This practice of enabling functions to be superceded by a derived class through inheritance is known as overloading. Overloading using the interface structure permits the execution of different loan processing strategies within the same fund.

By inheriting the IAsset structure, an IAssetLoan token can receive payment to its wallet in any accepted currency, process the payment including an update to any outstanding principal, process fees, and pass the proceeds to its owner. All transactions and payments can be inspected on the ledger providing transparency and data needed for asset valuation. Using the IAssetFund Asset Management Functions, the IAssetLoan token may be attached to a fund token. The loan token may be one of many IAssetLoan tokens to create a securitized fund. Loan payments are processed automatically by each loan with proceeds passed to the parent fund where they can be processed further as management fees, dividend distributions, and other fund functions as managed by the IAssetFund token. This structure creates a fully transparent, self-processing securitized loan pool that can scale indefinitely.

Figure 9:
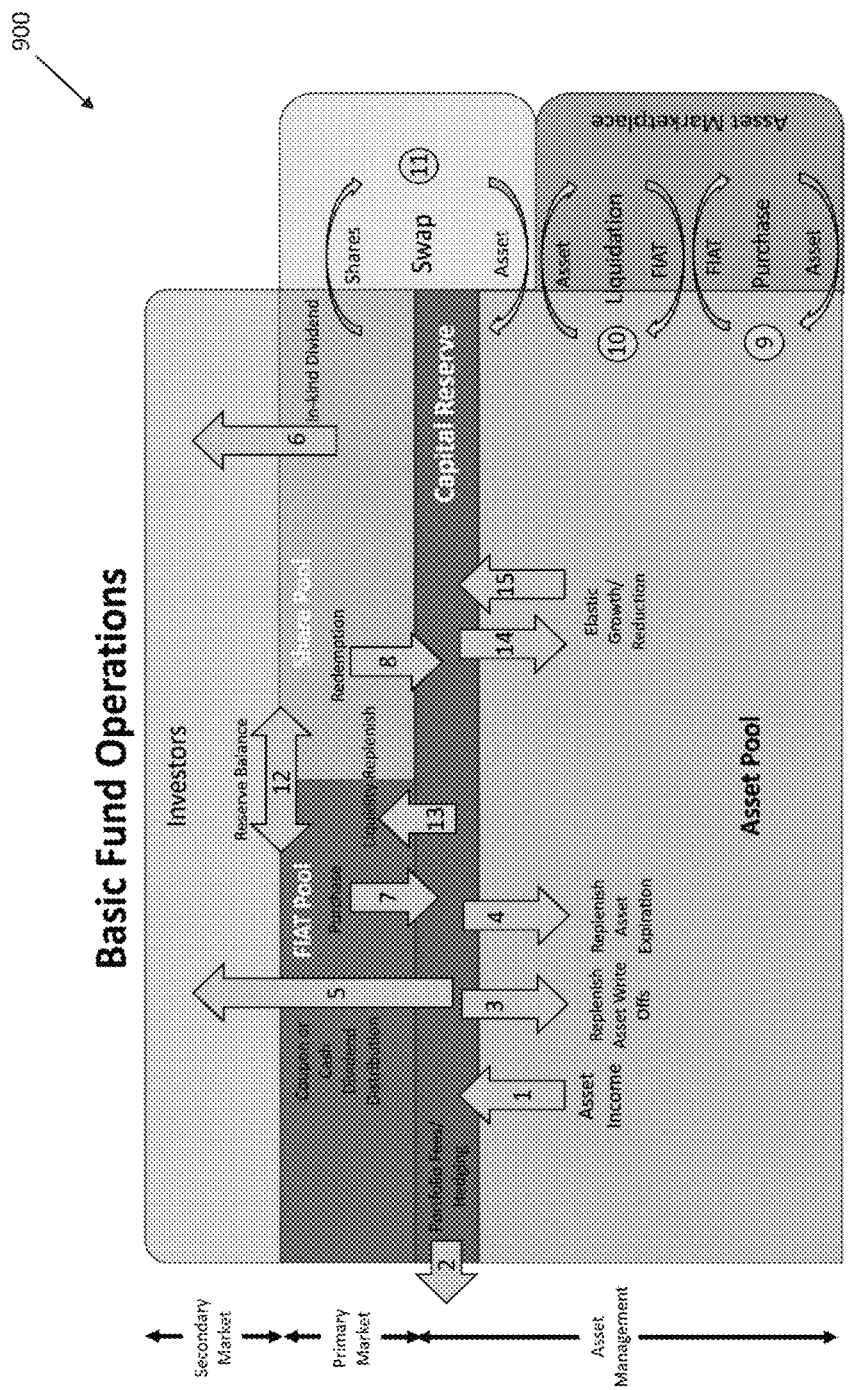
FIG. 9 illustrates basic fund operations than can be automated using a decoupled asset management logic and a fund structure in accordance with disclosed implementations.

Self-processing, self-reporting loan assets in a self-processing, self-reporting fund provides transparency not present in the massive securitized loan (e.g., RMBS) funds that were at the root of the Global Financial Crisis. Similar techniques can be used to create funds of any type of asset providing investors access to a diverse set of new investment opportunities. Further, the data model and architecture described above simplifies the automation of more advanced fund management strategies. FIG. 9 schematically illustrates a fund management environment 900 with common transactions for asset management and in the primary and secondary market. The implementation supports each of the operations through the use of the IAsset and IAssetFund interfaces disclosed above. Each transaction of FIG. 9 is described below.

Process Asset Income to the Capital Reserve (1): Income earning assets in the Asset Pool (leases, bonds, debt instruments, dividend paying shares, etc) process income using internal automated or external models. These earnings are processed via the asset wallet for distribution providing full traceability of asset performance. When the fund token owner executes a ProcessWaterfall request via its IAsset interface, a ProcessWaterfall request is called for each of the IAssets owned by the fund. As a result of this request, the fund's assets transfer earnings to the Capital Reserve (IAsset wallet) of the fund. The fund executes internal waterfall logic to process these earnings. The waterfall logic may be a plugin smart contract to support innovative or repeatable fund management strategies. On completion of processing, funds are transferred to the token's owner as defined by the token's processing logic (which may result in the execution of further distribution logic by the token's owner).

Process Portfollio Hedging/Management Fees (2): Typically fund waterfalls will include payment of asset management fees and may also involve other internal services for fund operations such as hedging and insurance. These fees are paid out of the Capital Reserve (asset wallet) using wallet transfer logic and may be executed via the waterfall logic smart contract. To maintain a consistent par value of the fund, these payments must be replenished to from asset income or other sources.

Process Replenish Write Offs/Turnover (3): Assets may be written off (residual value deemed to be zero) in a given period. Write offs result from defaulted loans or underperforming assets. To maintain constant par value, write offs must be replenished using assets from the Capital Reserve as part of the processing waterfall. Sufficient balance should be held back (not distributed) in the Capital Reserve to support "at risk" income streams, i.e. overdue loans or underperforming assets that may default in upcoming periods.

Process Replenish Asset Expiration (4): For certain types of funds, such as those consisting of expiring, illiquid assets, asset residual values (earning potential) are reduced as income is processed from the asset. For example, a payment on a mortgage that reduces the principal of the loan result in a reduction in the earning potential of the asset, its residual value. To maintain a consistent earning potential of the fund, the residual should be replaced through the purchase of assets with similar or better earning potential. Realized earning potential results in a reduction of the residual value of the asset pool (expiration) while increasing cash in the funds Capital Reserve. Asset purchases using Capital Reserve assets uses the IAsset CreatePurchaseOrder function. Asset purchases to Realizing income from contained asset distributions to the fund typically increases the overall NAV of the portfolio (increase in Capital Reserve balance exceeds the reduction in NAV of the asset pool) proportional to the asset's income stream risk. Portfolios consisting of rapidly expiring assets (trade finance) will see significant expiration in a given period. The higher the expiration percentage, the greater the elasticity ratio of the fund (elasticity of the fund relative to the elasticity of underlying assets).

Process Coupon or Dividend Distributions (5): Funds may offer coupon income or cash dividends to owner/shareholders. "Cash" may be any asset (fiat, crypto, or other asset types) but is typically liquid, readily traded in a pair for shares of the fund, and in the same asset type as the asset income. Coupon Distributions are paid preferentially before other fund payments whereas Dividend Distributions are made from the proceeds that remain after other waterfall responsibilities are met. To ensure fund stability, Coupon Distributions should be less than the overall expected income from fund assets especially in the case of asset income volatility or uncertainty. Distributions are made via the ProcessWaterfall method. CAT fungible tokens contain shareholder distribution functions. By attaching the asset token to the fungible token, distributions to the funds shareholders may be processed automatically and at scale. Many funds do not offer Coupon Distributions or Dividend Payments. In these cases, asset income increases the par value of the fund.

Process In-kind Share Dividend (6): Rather than cash dividends, funds may pay distributions using shares of the fund. This strategy is used for some funds for tax purposes or to enhance liquidity. Funds from the Capital Reserve may be used to purchase the shares to be distributed. These shares may be purchased using several strategies: from a liquid secondary market, from a liquidity reserve pool (described later) in the primary market at the funds NAV, or by issuing share tokens consistent with the funds NAV. The flexibility of the share purchase, redemption, and distribution model enables the IAssetFund structure to support any existing fund management strategy including ETFs, mutual funds, or closed-end funds. This also supports fund revenue optimization strategies for tax or liquidity benefits.

Process Primary Market Purchase (7): The IAssetFund token may be attached to a fungible token to facilitate fractional ownership. Investors may purchase or sell fund shares in the primary market using the SharePurchaseRequest and SharePurchaseSwapRequest methods supported by the fungible token interface. For open-ended funds, that is, funds where the share count may change based on market demand for the underlying asset, shares are issued (purchase) or burned (redeem) to support the request. Based on the fund's operating model, shares are delivered to the purchasing party in exchange for assets or cash-in-lieu (CIL)

of assets. SharePurchaseRequest is a CIL transaction. For this type of transaction, shares are sold at the fund's strike price, that is the fund's NAV divided by the total number of shares. The SharePurchaseRequest is made, the NAV is assigned, and the purchaser must fulfill the by supplying the "cash" assets required to fulfill the order. The IAssetFund token receives the cash and must purchase or assign the underlying from an asset marketplace or using the IAsset CreatePurchaseRequest function. SharePurchaseSwapRequest is used for transactions where the assets used for share purchase are consistent with the investment thesis or index (ratio of shares to underlying assets in the fund) of the fund.

Process Primary Market Redemption (8): This transaction is the opposite of the Primary Market Purchase transaction. Shares of the fungible token are sold to the fund in exchange for cash (ShareRedeem Request), or assets from the underlying fund (ShareRedeemSwapRequest). Depending on the cash in the Capital Reserve, it may be necessary to liquidate assets from the IAssetFund token using CreateSellRequest.

One implementation includes the establishment of a liquidity reservoir as a part of the fungible token to enable elastic securitization. The liquidity reservoir is a smart contract that prices Primary Market transactions (or Secondary Market limit orders for a separate implementation) based on the net inflow or outflow of capital to the fund. The Reservoir maintains a pool of shares and cash that can fulfill the orders. Price is adjusted around NAV based on the deviation of the reserve pool balance from the desired balance as set by the fund manager. For example, a significant inflow of capital via an imbalance of SharePurchaseRequests will increase the cash pool in the reservoir while decreasing the available share pool. A pricing algorithm (smart contract plugin based on fund manager strategy) increases share price in the reserve pool increasing the likelihood of a redemption while decreasing the demand for new purchases. The algorithms react to adjust the price of liquidity in the face of changes in investor demand to return the reservoir to balance.

Process Asset Purchase (9): In some portfolios, portfolio managers purchase assets using cash from the Capital Reserve. These purchases use the IAsset CreatePurchaseRequest. For example, assets that expire can replaced with cash from the Capital Reserve replenished by asset income. NAV assessments and hedging strategies are the principal responsibility of a portfolio manager as these decisions reflect overall portfolio alpha.

Process Asset Liquidation (10): If the Reserve Balance falls below the Liquidation Threshold, actions are triggered requiring portfolio managers to sell assets to restore portfolio liquidity requirements. These triggers may be enacted via smart contracts and are executed through the IAsset CreateSellRequest.

Process Swap (11): In other portfolios, assets enter the portfolio via swaps, i.e. exchanges of income earning shares for rights to asset earning potential. Some portfolios may use both techniques to acquire assets. The use of a swap vice cash purchases are preferred as this introduces additional liquidity into the portfolio.

Process Replenish Reservoir (13): In an elastic securitization model applied to a fund of income producing assets, cash distributions can be used to restore liquidity in the Reservoir if reservoir cash levels are low based on a sustained exodus of shareholders. The amount of reservoir liquidity to be restored in this step is determined algorithmically, a function of Reservoir Balance, Capital Reserve, and market conditions. If significant liquidity restoration is required, resources may be unavailable to replenish expiring assets resulting in a reduction of the par value of the portfolio. If income levels fall below the liquidation threshold, this triggers the asset liquidation step as described below.

Process Elastic Portfolio Growth (14): A sustained price above the NAV resulting from a sustained imbalance of purchase orders creates a cash imbalance in the Reservoir. If this price exceeds the NAV by a threshold, the assets may be transferred to the Capital Reserve to purchase more assets into the fund driving the growth of the overall NAV of the fund. Using this model, the NAV of the fund can grow elastically without the use of Authorized Participants or the issuance of new shares.

Process Elastic Portfolio Reduction (15): Investor liquidity needs may result in a net outflow of value from the cash pool. A sustained imbalance resulting in pricing below NAV signals a need to liquidate assets from the fund to provide the cash needed to restore the cash pool. Sustained portfolio underperformance will result in controlled liquidation of assets under management gracefully drawing down a fund manager's influence based on the performance of assets under his or her control. While technically closed fund, the elastic fluctuation in par value based on investor demand and asset performance provides desirable characteristics of an open fund. \

Elastic securitization is a process that allows the graceful growth and reduction in the size of a fund containing illiquid assets. The process addresses a market need to provide fund structures to facilitate exchange trading of illiquid assets providing a liquidity buffer between liquid assets trading on an exchange and illiquid assets in the underlying fund addressing the concerns implicated by SEC Rule 22e-4.

The flexibility of the linked IAssetFund and IAsset structure provides a mechanism to execute common and advanced fund management strategies. The structure makes it possible to automate common asset management functions and inject innovative fund management strategies while providing a transparency and simplified auditing and reporting. Linking fungible tokens to the non-fungible IAssetFund token provides new utility for fund shares. Shares may be: held for income (dividends) or growth; transferred as payment; held in escrow as collateral; monetized through exchange in authorized secondary markets for USD, BTC, EUR, or other securities; and/or used to participate in fund governance through proxy voting.

The disclosed implementations enable fund assets to be purchased or redeemed from the asset pool using fund shares via a swap mechanism. This creates a "backing" model enabling assets to be added or removed from the fund using token issuance and destruction. Additionally, an implementation may contain a liquidity pool to manage the net inflow and outflow of capital into the fund. A liquidity algorithm can be applied to set share price to help manage redemptions and facilitate the formation of a secondary market for the fund's shares. This model is repeatable and can be used to meet nearly any fund structure: Lending, Debt Instruments, Receivables, Structured Settlements, Factoring, Trade Finance, Insurance, Leases, etc.

As one example of a fund structure that automated by the disclosed implementations, a closed-end Lending Pool fund can be created leveraging a fund smart contract. The pool is funded from existing assets, warehoused loans, rehypothecation, or capital formation. At first, the pool contains only the capital (fiat or crypto) needed for lending. Using the fund smart contract format, the Pool exposes a NAV and PAR value (sum of the NAV and PAR value of all assets in the pool) and publishes supporting documents and a list of assets in real time. All fund transactions are recorded on an immutable ledger. The pool has a Portfolio Manager, Asset Manager(s), and optionally other services (hedging, asset insurance, etc.) Loans are originated by authorized agents and funds disbursed through an automated process. On origination, loans are added as assets to the fund. Using the disclosed implementations, all assets (available lending capital, receivables, and other assets) can be viewed by authorized parties in real time.

Loans are originated from the pool as smart contracts extending the (Asset Smart contract. This facilitates securitization, fund operations, and compliant transfers. As 'Asset objects, they publish supporting documentation, transaction history, and real time asset NAV & PAR value to authorized viewers. Loan Tokens leverage the IAsset structure to publish loan characteristics to enable independent analysis and valuation. Loan tokens may be wrapped in ERC-20, ERC-721, or other tokens to govern transfers.

Incorporated in the loan token is valuation and payment processing logic. Payments are made via simple transfers to an address (e.g. example specified in a QR code) specific to the loan. Payments are processed and proceeds are transferred to the asset's owner which may be a fund. The PAR value (Loan principal) and NAV (risk adjusted NPV of cash flows) for each loan are updated in real time with each payment. Transaction history for each loan is recorded on an immutable ledger and available for analysis by authorized users.

Pool Payment processing is automated and transparent. Proceeds from repayment of individual loan assets in the fund are transferred to the Risk Pool for further processing Risk Pool processing logic leverages a customizable smart contract to automate redemptions, loan write-offs, Pool capital replenishment, management fees, and dividend & coupon payments via a transparent and verifiable waterfall. Dividend and coupon payments and other distributions are transferred automatically to fund owners using fund logic embodied in a smart contract.

For enhanced liquidity and risk management, assets may be sold from (or purchased into) the portfolio. Supported asset transactions include purchase/sale via loan markets, redemptions and swaps using fund tokens. Other transactions include collections and write-offs. Dividend payments can be made in cryptocurrency, fiat, or in-kind pool tokens. Token issuance may occur through a primary market offering, auction, or through a tokenization of existing interests. Shareholders (Token holders) receive coupon & dividend distributions automatically and proportional to share ownership. The result is dividend paying tokens. Asset backed security tokens are revolutionary financial instruments. The tokens can be: (1) held to receive a dividend; (2) transferred as payment; (3) held in escrow as collateral; and/or (4) monetized through exchange in authorized secondary markets for fiat currency, cryptocurrency, or other securities.

Using elastic securitization mechanisms, growth in demand for tokens results in an influx of capital (in a model similar to growth in demand for a mutual fund). Additional capital results in expansion of lending pool PAR value providing more assets for lending. This model can grow indefinitely Similarly, capital exodus caused by underperformance or other factors results in a controlled drawdown of portfolio NAV. This model is repeatable and can be used to meet nearly any securitization need, including lending, debt instruments, receivables, structured settlements, factoring, trade finance, insurance, leases, and the like.

Figure 10:
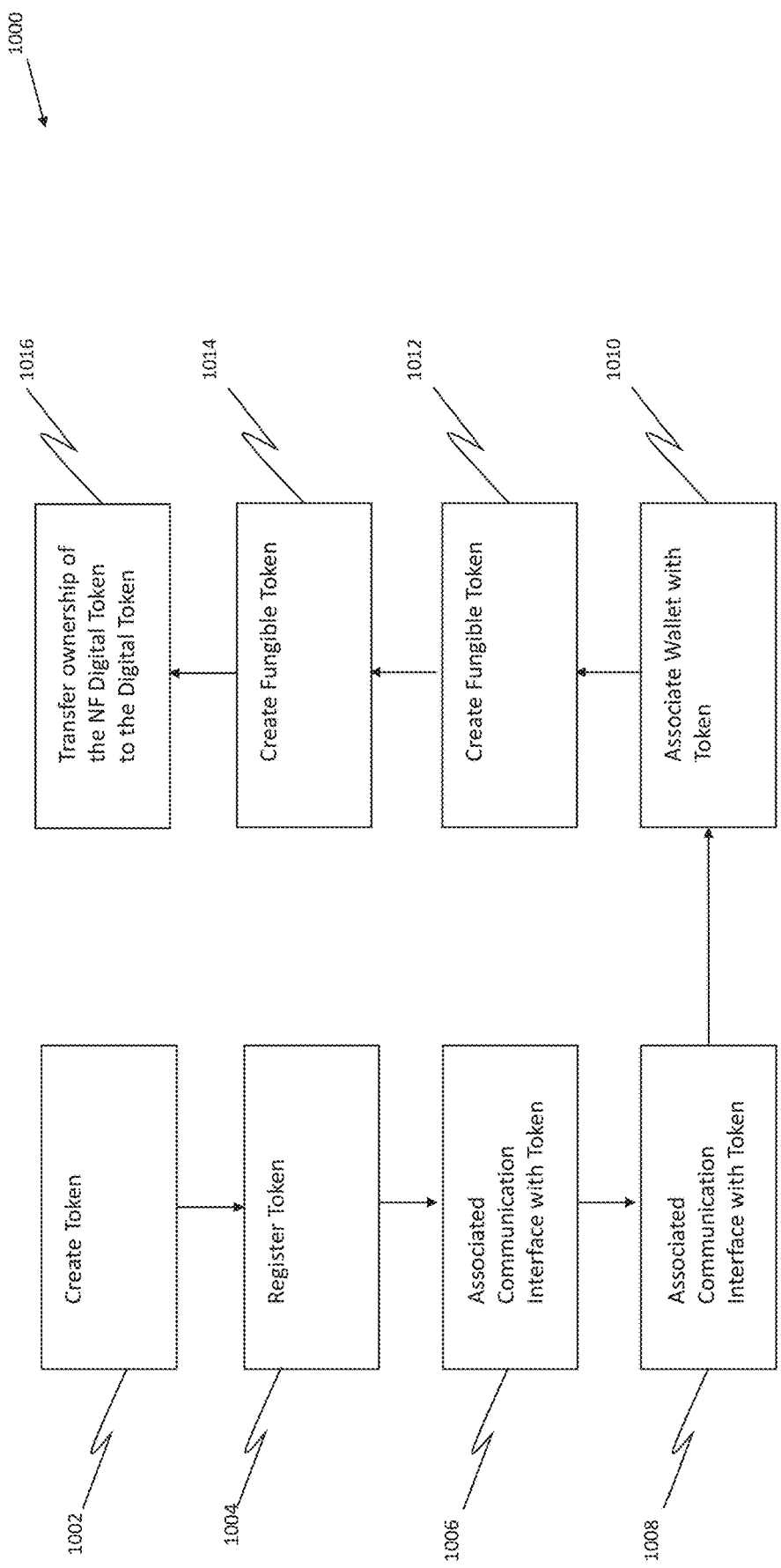
FIG. 10 is a flow chart of a method for configuring a computing platform to process a fund structure in accordance with disclosed implementations.

FIG. 10 Illustrates a method 1000 for configuring a data storage and retrieval system for managing data relating to tokenized assets. At 1002 a digital token is created in accordance with a class definition, the token including a unique token identifier. At 1004, the digital token is registered in association with an asset as a unique record in a memory device of an asset registry. At 1006, a communication interface is associated with the digital token in accordance with the class definition. The communication interface can be compliant with a communication specification implemented by the asset registry and which is configured to expose a set of predefined functions. The predefined functions can include asset ownership transfer functions, asset valuation publication functions, asset attribute determination functions and asset specific processing logic.

At 1010, a cryptographic wallet can be associated with the digital token. The wallet is configured to conduct token functions that are recorded in the asset registry. If the digital token is non-fungible, a fungible digital token can be created at 1012. At 1014, a cryptographic wallet can be associated with the fungible digital token. The wallet is configured to conduct token functions. At 1016 ownership of the non-fungible digital token can be transferred to the fungible digital token in order to wrap the non-fungible digital token with the fungible digital token and thereby enable fractional ownership of the asset represented by the non-fungible token including functions associated with shared ownership such as multi-party dividend distributions, corporate governance, and share trading.

Figure 11:
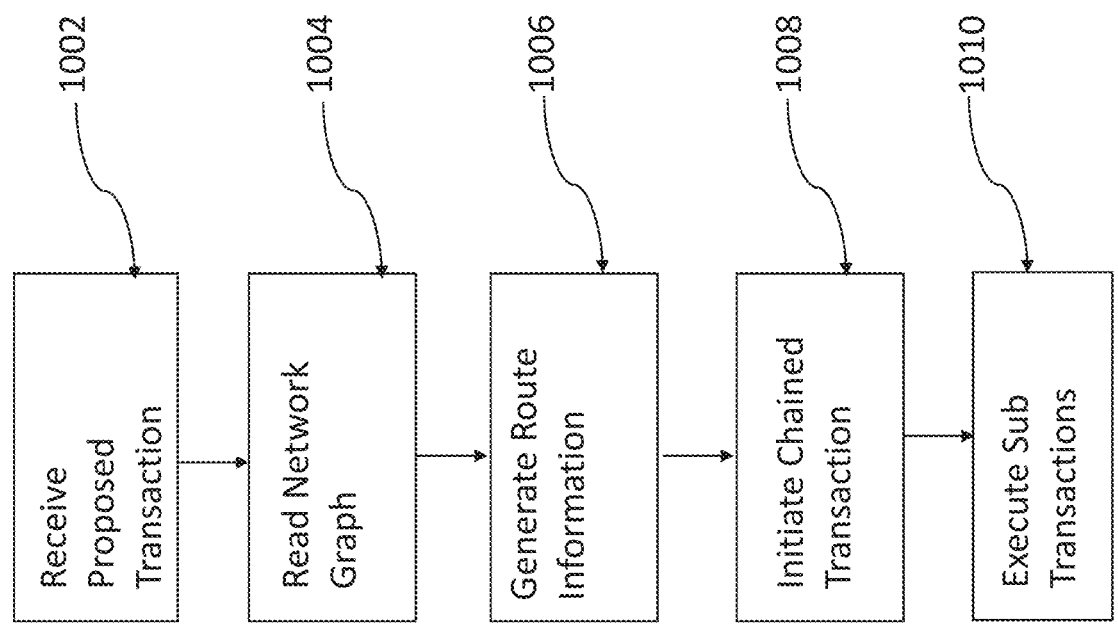
FIG. 11 is a flow chart of a method for providing communications between dissimilar networks in accordance with disclosed implementations.

The above tokens can be used to transfer value within a DLT network and across multiple DLT networks or other transfer networks. FIG. 11 illustrates a method of interfacing heterogenous DLT systems for conducting a transformation transaction in accordance with a disclosed implementation. At 1002, information is received describing a desired/requested cross ledger transaction that spans at least two dissimilar networks, such as two different DLT networks. At 1004 a multi-network graph structure is read. The graph structure can be created by crawling nodes corresponding to bridges that span networks. Each node in the graph structure can have an associated set of attribute variables as node metadata. The attribute variables can include units of value (tokens) native to the corresponding network, identification of smart contracts implementing the tokens, wallets or accounts used for bridging, value sources available to the user, and API's and network interfaces to other networks. At 1006 transaction routing information is generated for effecting the transaction by traversing the graph structure in accordance with a node traversing algorithm and detecting bridge nodes that facilitate the desired transaction. At 1008, a transfer path is selected by the source based on preferences using the transaction routing information and the transfer is initiated. The desired transfer path can include a chained set of sub-transactions that ensures proper execution of the requested cross ledger transaction. At 1010 sub-transactions are executed using the specified interfaces to achieve the cross network transaction. Sub-transactions are executed on heterogeneous networks using an ontology mapping that converts syntax-independent execution instructions to specific instructions recognized by the underlying transfer network. The overarching transaction and all sub-transactions can be recorded on a ledger, that may be distinct from the ledgers involved in sub-transactions. The independent ledger may utilize zero knowledge proofs to provide immutability while maintaining transaction privacy. Note that the chains of sub-transactions can include transactions in the source network, the destination network and other networks that serve to as connections between the source network and destination network.

Figure 12:
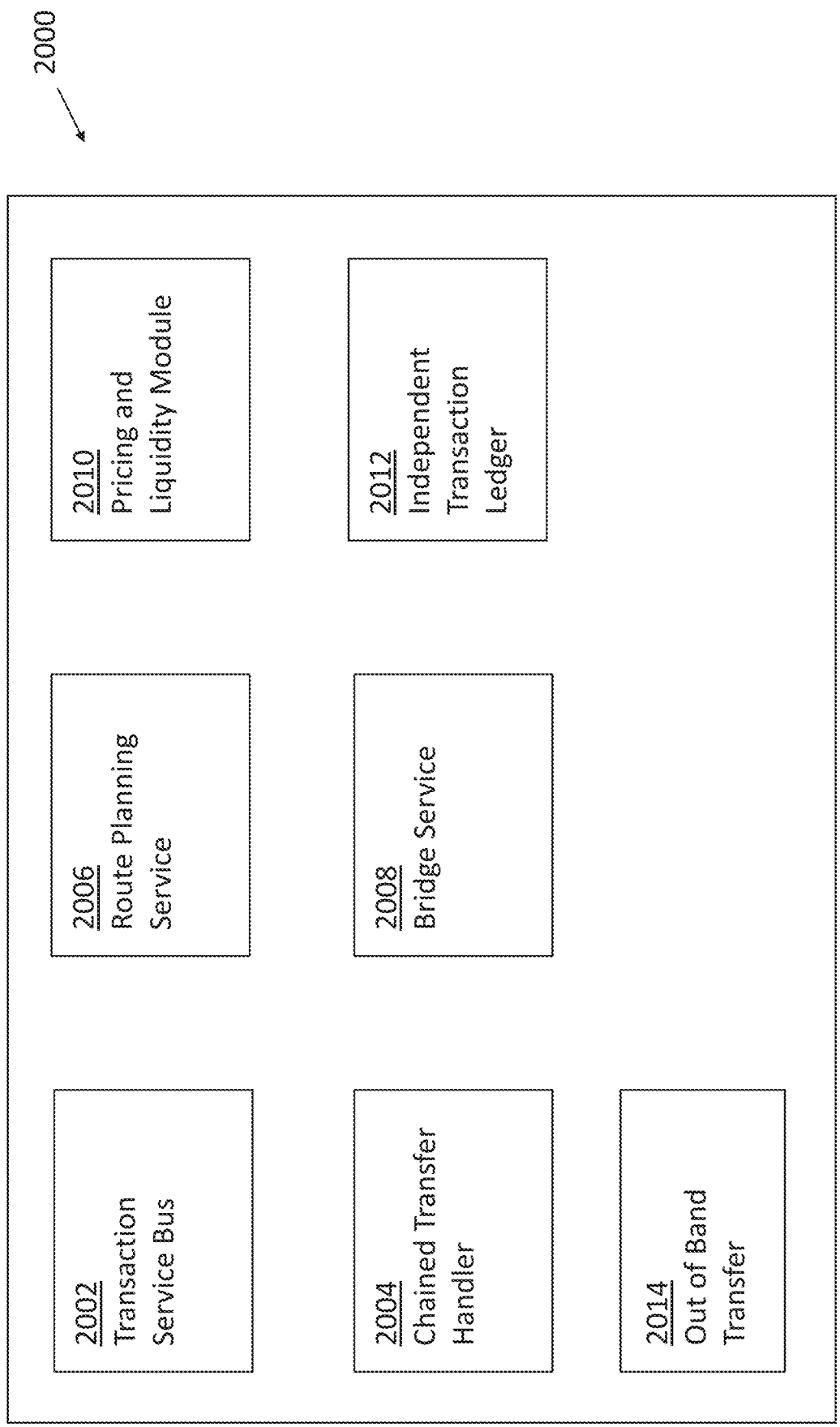
FIG. 12 is a schematic diagram of a computer architecture for providing communications between dissimilar networks in accordance with disclosed implementations.

FIG. 12 schematically illustrates a computer architecture in accordance with a disclosed implementation for accomplishing the method of FIG. 11 and other transformation transfers. The architecture 2000 consists of Transaction Service Bus module 2002, Chained Transfer Handler module 2004, Planning Service module 2006, Bridge Service module 2008, Pricing and Liquidity module 2010, Independent Transaction Ledger module 2012, and Out-Of-Band Transfer/Replenishment module 2014. Each module of architecture 2000 can communicate with the others as necessary through a networked computing environment.

The modules described herein can be implemented as computer executable code within a single computer processing unit or multiple computer processing units. One or more of the modules may be implemented remotely from the other modules in a distributed architecture. The description below of the functionality provided by the different modules is for illustrative purposes, and is not intended to be limiting, as any of modules may provide more or less functionality than is described. For example, one or more of modules may be eliminated, and some or all of its functionality may be provided by other ones of modules.

As described above, automated execution of transformation transaction, such as an inter-network (cross-ledger) transaction, is accomplished in response to receiving a transaction data structure specifying the details of a proposed cross ledger transaction, such as a value transfer. The data structure can include transaction details (e.g., source, destination, amount, currency) and can be created by a party with the authority to initiate the transfer. For example, the transaction data structure could be (TransactionType=Transfer, TransactionCurrency=Ether, Source=[wallet 1 address], Destination=[wallet 2 address]).

Transaction Service Bus module 2002 parses the transaction data structure and determines, based on the graph, one or more viable paths (including expected pricing, fees, and transaction times) for traversing multiple networks to execute the specified transaction. The path determination is made based upon a model of the networks determined by Route Planning Service module 2006 (in the manner described in detail below) and includes a transaction chain consisting of multiple sub-transactions, each sub transaction having a source and a destination. If asset transformation is required on a path, Pricing and Liquidity module 2010 specifies the ratio between the source and destination assets required for a bridge traversal based on bridge metadata (described below). Chained Transfer Handler module 2004 executes the sub-transactions (with Zero Knowledge Proofs, as desired to protect privacy) as a sequence of network transfers, confirmations, and bridge traversals (as specified by Bridge Service module 2008 described below) to ultimately affect the value transfer of the specified transformation transaction. Out of Band Transfer module 2014 can be used to include non-network (manual or un-instrumented) transfers. Out of Band Transfer 2014 module is used to rebalance account resources, as needed, based on the consumption of liquidity in the sub-transactions. Transaction records can be recorded by Independent Transaction Ledger module 2012. Disclosed implementations can leverage the compliance framework described US Published Patent Application No. US20190164151 A1 to safeguard cross ledger transactions and conduct compliance verification on dissimilar networks.

The model of the networks noted above is created by Route Planning Service module 2006 utilizing a multi-agent system that crawls various networks (which may be expected to participate in a cross ledger transaction) and bridge node to identify a viable path for the transfer of value between the source and destination. The inter-network topology can be stored as a graph structure of nodes. The node attribute variables are described in greater detail below and can include descriptions of value units (tokens) native to the particular network, traversal methods, accounts used for bridging, fees and pricing methods, and associated API's and network interfaces for the purposes of communication with external sources.

Figure 13A:
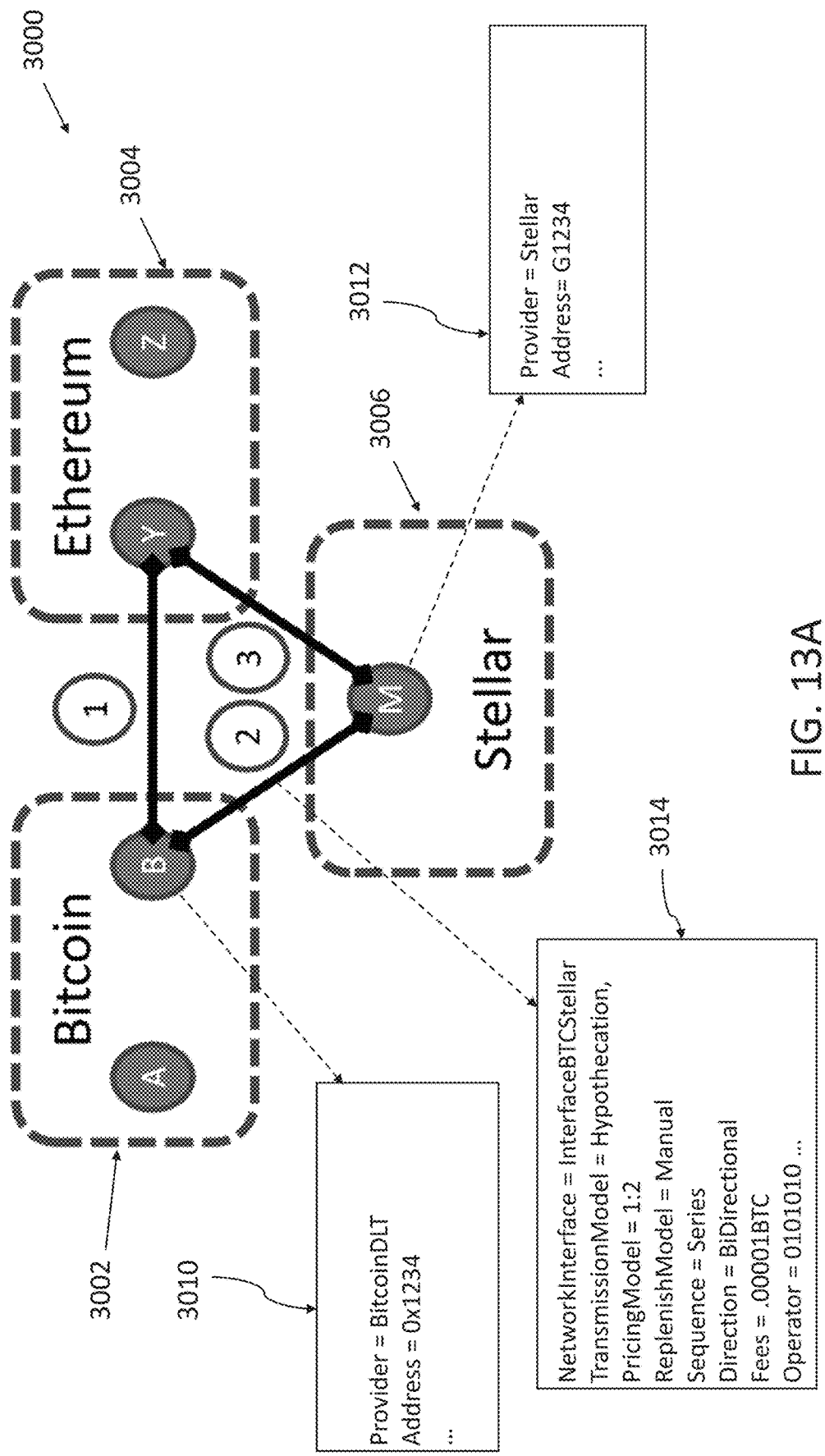
FIG. 13A is a schematic illustration of a node graph in accordance with disclosed implementations.

FIG. 13A is a schematic diagram of an abstraction of a simple graph structure 3000, traversed by the Route Planning Service module 2006, of an inter-network topology in accordance with an implementation. For example, Network 3002 can be the Bitcoin blockchain, network 3004 can be an Ethereum protocol blockchain, and network 3006 can be a Stellar protocol blockchain. In FIG. 13A, three dissimilar networks (3002, 3004, and 3006) are illustrated however, any number of or any type of dissimilar networks can be included in implementations. In FIG. 13A, each network has an illustrated bridge node, each node representing one side of a Bridge that provides communication between networks. Node B is a bridge node in DLT network 3002, node M is a bridge node in DLT network 3006, and Node Y is a bridge node in DLT network 3004. Each bridge node corresponds to an account/wallet in the corresponding DLT network. A pair of bridge nodes Bridge. For example, nodes B and M define a Bridge between DLT network 3002 and DLT network 3006. Each bridge node has a corresponding metadata record indicating the above-noted set of attribute variables. Further, bridge characteristic data is stored as bridge metadata. Each pair of bridge nodes connected with a line in FIG. 13A, and the associated metadata (node metadata and bridge characteristic metadata) defines a Bridge. Of course, there can be any number of nodes and bridge nodes in the graph (typically thousands) and FIG. 13A is a simple graph for illustrative purposes.

Figure 13B:
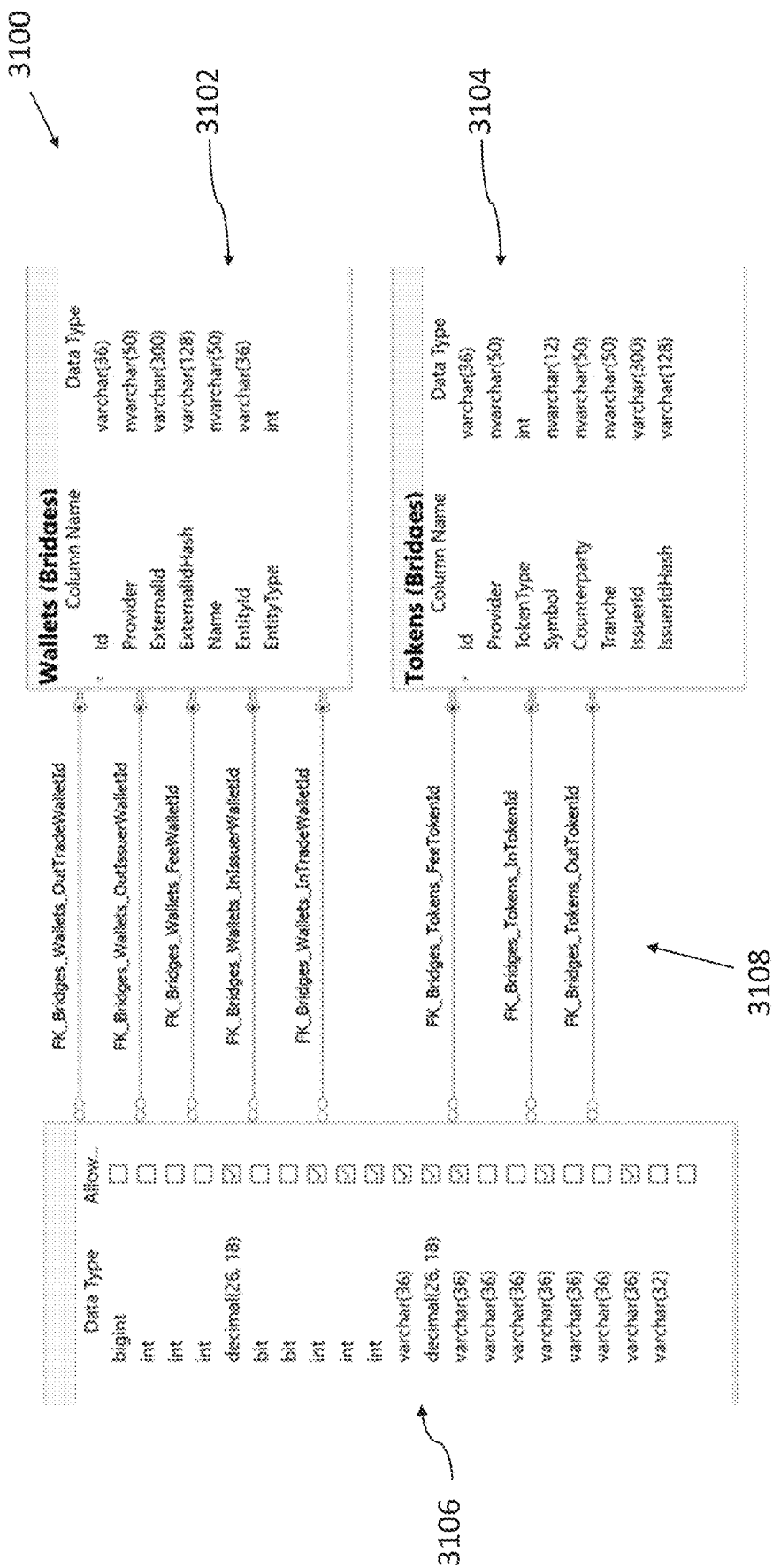
FIG. 13B is a schematic illustration of a bridge metadata schema

As an example, metadata record 3010 is stored in association with node B, metadata record 3012 is stored in association with node M and bridge characteristic metadata record 3014 is stored to define the connection between node B and node M. Therefore, a Bridge is defined by metadata records 3010, 3012, and 3014 (collectively bridge metadata") of graph structure 3000. A more detailed schema 3100 of the bridge metadata, in accordance with an implementation, is shown in FIG. 13B. Schema 3100 includes wallet attributes 3102 (which can be stored in the graph as node metadata), token attributes 3104 (which can be stored in the graph as node metadata), data type attributes 3106 (which can be stored in the graph as bridge characteristic metadata), and interfaces 3108 (which include pricing models and other logic and which can be stored in the graph as bridge characteristic metadata). While metadata records 3010, 3012, and 3014 of FIG. 13A are illustrated as three distinct records, the data therein can be combined into a single record of bridge metadata or divided over additional records based on the architecture of graph 3000. Disclosed implementations use a standard schema for specifying the metadata. Bridges serve as connection paths between dissimilar networks. The graph allows transaction paths to locate and use Bridges in cross-ledger transaction chains (or in certain cases in intra-ledger transactions as discussed below. The metadata records 3010, 3012, and 3014 is discussed in greater detail below in connection with Bridge functions.

The data in graph 3000 is stored by the Bridge Service module 2008 and traversed by the Route Planning Service module 2006 Transaction Service Bus module 2002 provides optimized transaction routing information, including sub transactions required to effect the transformation transaction. When presented the routes, the source account can initiate a chained transaction, based on the graph and user preferences such as one or more of transaction time, conversion rates and fee load. Chained Transfer Handler module 2004 manages transaction execution including the proposed sub transactions to ensure proper transfer execution (or rollback) through ultimate delivery. Route planning and path optimization are described in greater detail below.

Transaction Service Bus module 2002 implements a finance ontology, that serves as a syntax-independent model of value transfers, a catalog of transfer messaging terms and associated items, and a translation schema to convert heterogeneous implementations of the various networks to the syntax-independent model. Chained Transfer Handler module 2004, executes sub-transactions on heterogeneous networks via the Transaction Service Bus module 2002 which translates the proposed sub-transactions from the syntax-independent instructions to the network specific implementation.

The finance ontology is an abstraction layer that provides a common language for financial transactions. The ontology defines interfaces for the services, functions, and objects encountered in financial systems. The ontology provides an interoperability layer isolating the differences between the implementations of individual service providers providing for a flexible modular system where individual components are loosely coupled. The ontology makes it possible to compose individual financial services into complex financial systems even if individual services are not designed to work together. Since payment chaining is designed to connect any transfer network to any other transfer network, the common service definition reduces the complexity of the interconnecting N systems from N factorial (N!) to N. Thus, the ontology is designed to make large integrations tractable. Standard functions and interfaces of the technology are discussed below.

However, developing a common abstraction for each underlying provider for the sake of tractability may reduce the expressivity (that is, special features that can be exposed by unique providers) of individual providers. The disclosed framework has two mechanisms to ensure that expressivity is not lost for tractability. First, "wrappers" may expose features that are unique to a specific provider/network or to a subclass of providers/networks. In this case, dependent clients may interface directly with the an implementation specific wrapper to leverage these unique features. However, this creates a direct dependency between the client and service implementation that tightly couples the client to the service implementation limiting modularity and scalability. The implementer may decide if the tradeoff to gain unique functionality is worth the increased dependency on a specific provider/network. Additionally, the ontology includes a data structure that enables additional data with a locally defined specification to be carried in a general purpose interface. The core data structures include an OtherData field that has a specification that includes type and data information enabling parsers to inspect the data and parse it if the format is recognized. This structure enables point to point communications between systems that may require additional data to be carried in structures used by all parts of the system. As a result, coordinating functions, like those exhibited in the Chained Transfer Handler, can perform functions at global scope without sacrificing the unique features of specific transfer providers.

As noted above, Bridge Server module 2008 provides logical interfaces, Bridges, between the various DLT networks and relays transactions and value between them. Bridges can accommodate token types representing dissimilar assets and units of value. Bridge server module 2008 implements the Bridges to create a logical cross-ledger connection based on the model and node metadata. Essentially a Bridge is a data structure that defines the transfer behavior. Bridge Server module 2008 reads the metadata records 3010, 3012, and 3014 (FIG. 13A) and determines bridge type, assigns Vostro wallet(s), assigns Nostro wallets, identifies fees, determines pricing models, assigns out-of-band replenish as necessary, and identifies and attaches transformation logic in the manner set forth below. A bridge operator, that is an entity or system process with appropriate permissions to operate via both networks spanned by a bridge can be indicated in the metadata record 3014. Bridging accounts are created or assigned to link the source and destination networks. The source account in a Bridge is often a custody account and should be active for two way bridge support and the destination should be active and may require a linked issuer for certain types of transfers.

Various classes of Bridges can be created and stored by Bridge Service module 2008, with a range of options in price discovery (pegs, floats, exchanges), accounting (translation, indenture), and transfer (in band, out of band). These classes provide common interconnectivity patterns facilitating repeatable processes to execute and record the movement of value between networks. A contained bridge class is composed of options in areas such as price discovery, accounting, and transfer (e.g., in-band and out-of-band combinations), as specified by the metadata model. Dissimilar networks are connected together using Bridges and thus Bridges facilitate the flow of value between networks and can extracting a toll for the service, as specified by the metadata. Bridges create connections between networks or units of value that receive and relay value transfers across different transmission networks by controlling:

Transmission mode: hypothecation (by reference), settlement (by value), linkage, or trade—transformation (changing, splitting the assets)

Pricing: exchange, algorithmic, pegging

Synchronicity: Synchronous or asynchronous (with hedging & risk management)

Fee, capital supply logistics, and liquidity management

Each Bridge includes an inbound account and an outbound account (associated with, for example, nodes B and M respectively in FIG. 13A. The accounts can be owned by the bridge operator with "system" permissions to be operated as part of a transaction chain. These accounts are provided as configuration parameters in the bridge metadata during the creation of the Bridge. The value units supported by the inbound and outbound accounts defines the connections supported by the Bridge. Supported connections are necessary for transfer routing. Using the example of FIG. 13A where a transaction originates in the Bitcoin Ledger (DLT network 3002) and crosses into the Stellar Network (DLT Network 3006), the inbound (Vostro) Account of the Bridge (for example B in FIG. 13A) becomes the destination account for the initial sub payment in the transaction chain. This account does not need to be an "Active" account, that is containing authority to operate unless "rollback" capability is required. The outbound (Nostro) account of the Bridge (for example M in FIG. 13A) is used to send value down the chain or to the final destination. The Nostro account should be Active, meaning the processing thread should have the authority to initiate a transaction from the account. For Dark Pool transactions, that is a transaction with prepositioned value, sufficient value must be present in the inbound bridge account prior to initiating the chained transaction. Bridges can be loaded from Bridge Server module 2008 into a list used by Chained Transfer Handler module for route planning and payment execution. The class used to execute the Bridge is determined by the configuration.

The list of possible routes from one wallet type to another wallet given the desired destination value unit can be determined by evaluating the supported tokens, indicated in bridge metadata, for inbound and outbound wallets used by the available Bridges. Route Planning Service module 2006 uses this list when mapping paths from source to destination. For example, graph 3000 of FIG. 13A shows two possible routes between DLT network 3002 and DLT network 3006. The first route is indicated by 2 and the second route is indicated by the combination of 1 and 3.

In addition to Bridge configuration details, operational attributes of Bridge classes are determined by dependency injected details and can be stored as bridge metadata. Variations in Bridge operations in disclosed implementations can be divided into 6 attributes defined in the metadata: Transmission Model, Pricing Model, Replenish Model, Sequence, Direction, and Fees. The Transmission Model defines how ledgers are linked together via bridging wallets. Five types of Transmission Models can be implemented: Hypothecation (Deposit), Settlement (Withdrawal), and Transfer (NostroVostro), Transmute (ledger change), and Transform. The model to be used can be determined based on the desired transfer mode, bridge operator's ability to perform issue/burn operations, the availability of custody wallets, and other business requirements.

The Pricing Model defines the ratio of the number of destination ledger tokens sent for every source token received by the bridge. Pricing Model implementations include: a Link (1:1), a Peg (fixed ratio), Algorithmic (dependency injected plugin), or External (taken from a third party source such as an exchange). The Replenish Model defines the mechanism used to refill the outbound wallet when excessive unbalanced flow takes place and resources must be repositioned. Replenish Model implementations include: None, Manual, Transfer, and Exchange. Bridges have a Sequence (Series/Parallel) and Direction (Unidirectional/Bidirectional) indicating how they can be executed.

In cases of multi-ledger issuances, Bridges may implement cross-ledger transmutation. This may be used when the official record of ownership is on a separate ledger than the one being used for transfer, or the official record is the sum of ownership records on affected ledgers. Transmutation permits tokens to be issued on multiple ledgers and/or provides a means by which tokens issued on one ledger can "flow" to another. As tokens move from ledger to ledger, the total number of tokens in circulation remains constant while the ownership record moves from ledger to ledger.

For example, funds exiting a ledger are sent to a Source Ledger Base Wallet. This transfer may also be an escrow transaction placing a hold on the tokens without moving them. An equivalent number of tokens are issued into circulation on the Destination Ledger from the Issuer (wallet, account, or smart contract) or Cold Wallet to the Outbound Wallet on Provider B for delivery to the destination. On successful delivery, the IIssuer.Destroy function called on the source ledger removing the tokens from circulation.

Figure 14:
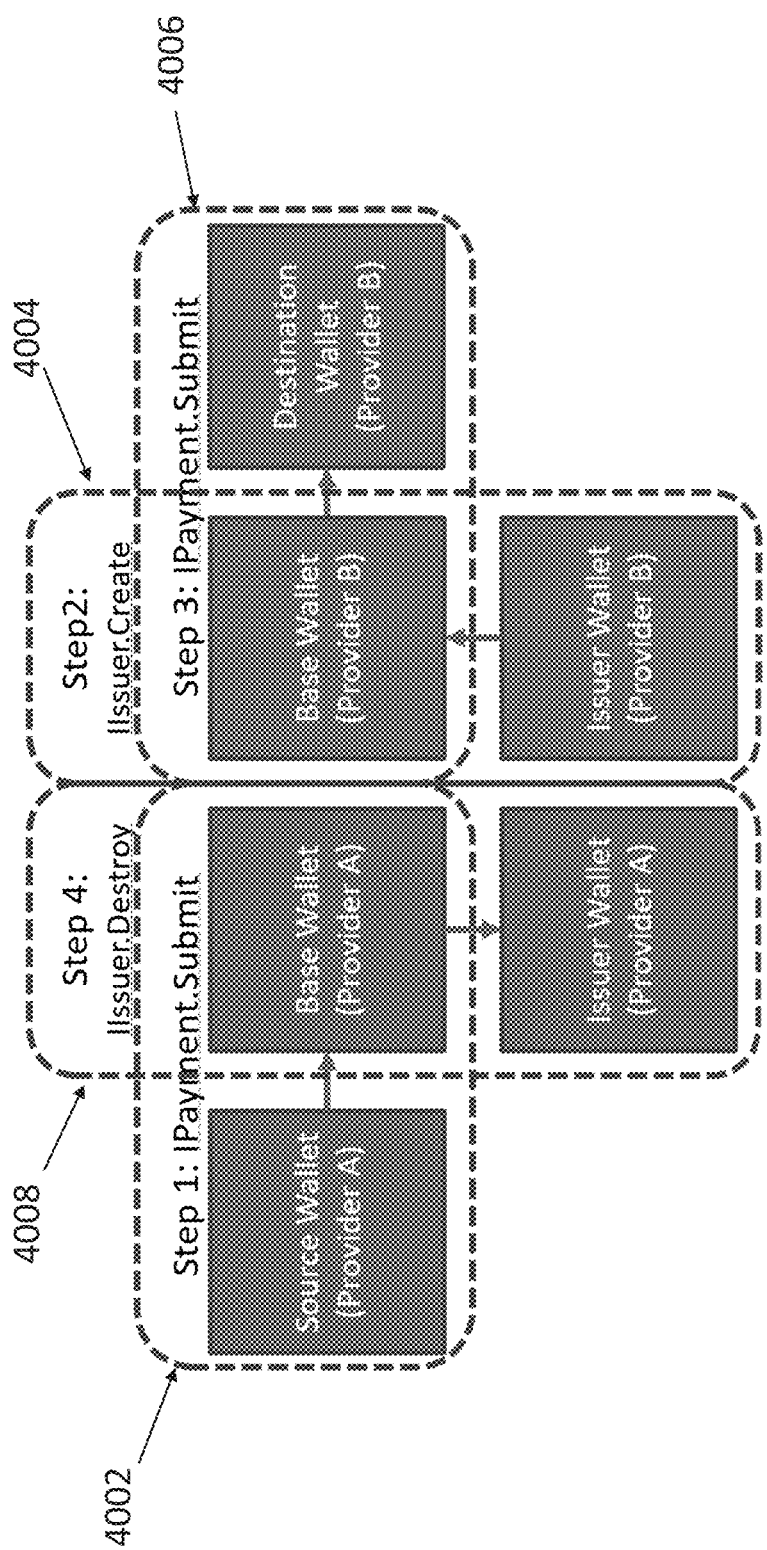
FIG. 14 is schematic diagram of an example of a chain of sub transactions for accomplishing a cross ledger mutation in accordance with disclosed implementations.

An example of a chain of sub-transactions for accomplishing a cross ledger transmutation, that is the creation of one unit of value corresponding with the destruction of another, is illustrated in the flowchart of FIG. 14. An example of a transmutation transaction is the movement of share representing beneficial ownership from one ledger to another. At 4002, Value is sent from Source Wallet to Base (Escrow) Wallet using Provider A. This wallet is the Bridge Inbound Wallet. At 4004, tokens are issued from Provider B Issuer Wallet and sent to the Base Wallet on Provider B (Bridge Outbound Wallet based on Bridge attributes). At 4006, base wallet on Provider B sends value to Destination Wallet on Provider B. At 4008, on transaction completion, equivalent number of tokens are destroyed from Provider A Base Wallet. Note that this process assumes that Chained Transfer Handler module 2004 has a mechanism to detect and attribute transactions on the source and destination ledger and a mechanism to create tokens on Provider B and burn (destroy) tokens from the Base Wallet on Provider A. Access to these authorities can be indicated by bridge metadata. Also, it is possible to skip steps 4004 and 4008 by issuing and burning tokens directly through the issuer wallet.

In some cases, it may be desirable to convert the rights represented in tokens from one form to another. For example, it may be desirable to convert the loan rights represented in a convertible note into an equity position. In this case, a fixed ratio transform (e.g. 1 share debt=1 share equity or 10 shares debt=1 share equity) using the earlier transmute function can be used. However, it may be useful to split rights in a common share into separate tokens that function differently with one representing voting rights and the other representing beneficial ownership of income or equity proceeds. In this case, a custom transaction transform Bridge is required. For each type of token delivered to the inbound wallet, more than 1 type of share may be produced and delivered to the destination. The basic sequence of a Transform transaction is the same as a Transmute transaction, but the Bridge must execute instructions to issue 2 or more types of instruments on the outbound transaction and must deliver each instrument to the desired destination wallet. The reverse transaction may be conducted to combine rights into a new composite right (e.g. combine voting and beneficial ownership into a common share). A transform Bridge can be an intra-ledger bridge, i.e. need not span multiple networks.

Figure 20:
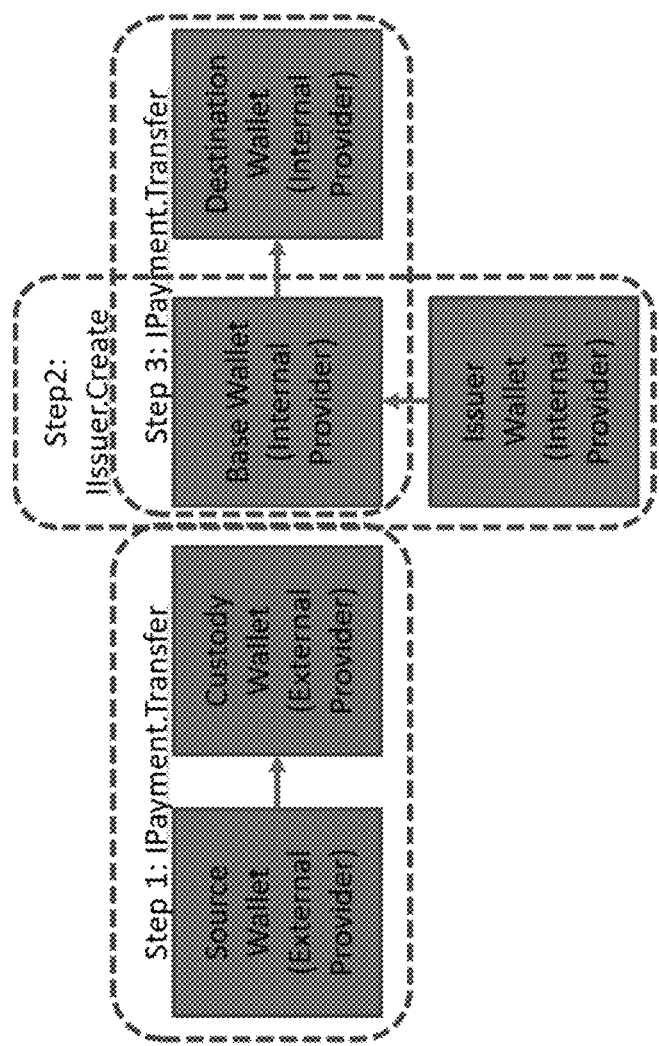
FIG. 20 schematically illustrates an example of the operations for a Bridge accomplishing a hypothecation transfer in accordance with disclosed implementations.

Exchange Bridges are a special kind of Bridge where Price Discovery or Movement of funds involves an exchange inline or Out Of Band (OOB). In this case, the amount of funds required for the source transaction depends on the current Total Volume Price (integral of order book) of the equivalent trade on an exchange. Funds are then replenished inline or Out of Band in batch. In some cases, the inbound transfer may be to an exchange account for inline transactions. In this case the Nostro account, would also reside in the exchange. Nostro accounts may use the same provider as the Vostro account if exchange is not available via the Provider network but different currencies are supported. Other types of bridges are discussed below with respect to FIGS. 20 and 21.

The disclosed implementations include Transaction Service Bus module 2002, also known as "InfinXchange™", an interface architecture that includes libraries that map and serve interfaces and data structures Transaction Service Busfor DLT and traditional value transfer networks (e.g., Ethereum, PayPal, SWIFT) and value transfer models. As noted above, the interface(s) required by a Bridge can be specified in the Bridge metadata. These interfaces expose the functions required to execute procedures used for transformation transactions. The InfinXchange wrappers implement a hub and spoke model for integration, through which dependent services, like Chained Transfer Handler module 2004, only need to integrate with the required interface once to orchestrate transactions across wrapped transfer networks.

Transaction Service Bus module 2002 can be implemented as an abstraction layer that provides a common interface for intra-ledger transactions. To participate in a cross-ledger transaction as either the source or destination ledger, a transaction provider can be wrapped in an InfinXchange wrapper. The wrapper is an executable that integrates with the underlying transfer provider to execute transactions and react to activity in the network. The wrapper exposes common interfaces as defined in the finance ontology. These interfaces decouple business and transaction logic associated with chaining from the specific implementation details of a transaction provider and permit broad reuse of transaction patterns.

Transaction providers/networks vary broadly in implementation and integration patterns. For example, blockchain networks require a client that interacts with the nodes while many payment networks expose APIs. APIs are implemented using REST, SOAP, RPC, and other patterns. Corporate accounting systems often run on relational databases with no specific pattern for integration. A Transaction Service Bus module library can be developed to integrate with a transaction provider implemented in any of these styles to provide a common pattern for interacting with the underlying service.

Transaction Service Bus module libraries connecting to each provider can be injected into the chained Transfer handler module 2004 using an abstract factory pattern. The abstract factory pattern is a known mechanism for encapsulating a group of individual factories that have a common theme without specifying their concrete classes. For example, client software can create a concrete implementation of the abstract factory and then use the generic interface of the factory to create the concrete objects that are part of the theme. Factory patterns separate the details of implementation of a set of objects from their general usage.

Again, interfaces that define the connections are found in the finance ontology. As a provider is initialized, it publishes its support for service interfaces and functions to the calling service. This enables the calling service to identify the services and methods that are supported by the transaction provider. Using this information, the calling service can determine the eligibility of a provider to support a transaction type. Any provider participating in a chained transaction should support the IPaymentService abstraction. A short list of frequently used services from the Finance Ontology are described below.

- IPaymentService: executes all transfers of value. Functions include: estimating costs for a transaction, executing the payment, validating its completion, and obtaining a list of payments from the source
- IWalletReaderService: identifies account balances (the amount of value available at a particular wallet address) and is used to obtain details about the wallet (e.g., supported currencies, date created)
- IWalletValidatorService: determines if a wallet is eligible for transactions, including ownership by the entity claiming it.

The IPayment service and IIssuer service can layer over any payment system and execute transfers via that provider. Example pseudo code and related data structures for the interfaces can be found immediately below.

```
public interface IIssuerService
{
    /// <summary>
    /// Issues an amount of new tokens to a designated wallet.
    /// </summary>
    Task<ITransaction> IssueAsync(IWalletIssuerActive wallet,
IAmount amount);
    /// <summary>
    /// Destroys an amount of new tokens from a designated wallet.
    /// </summary>
    Task<ITransaction> DestroyAsync(IWalletIssuerActive wallet,
IAmount amount);
    /// <summary>
    /// Freezes a token.
    /// </summary>
    Task<ITransaction> FreezeAsync(IWalletIssuerActive wallet,
IToken token);
    /// <summary>
    /// Retrieves token details.
    /// </summary>
    Task<ITokenDetail> GetTokenDetails(IWalletActive wallet, IToken
token);
}
public interface IPaymentService
{
    /// <summary>
    /// Calculates available routes to deliver amount to designated
wallet.
    /// </summary>
Task<List<IPaymentOption>> PrepareAsync(IWalletActive wallet,
IWallet
destinationWallet, IAmount amount, IFilter filter = null);
    /// <summary>
    /// Executes payment using IPaymentOption path using authority of
active wallet
    /// </summary>
Task<ITransaction> SubmitAsync(IWalletActive wallet, IPaymentOption
payment);
    /// <summary>
    /// Cancels ongoing payment transaction using authority of active
wallet
    /// </summary>
    /// <remarks>
    /// Not all providers will support this action
    /// </remarks>
    Task<ITransaction> CancelAsync(IWalletActive wallet, string
uuid);
    Event Complete(ITransaction trans);
}
```

Figure 15:
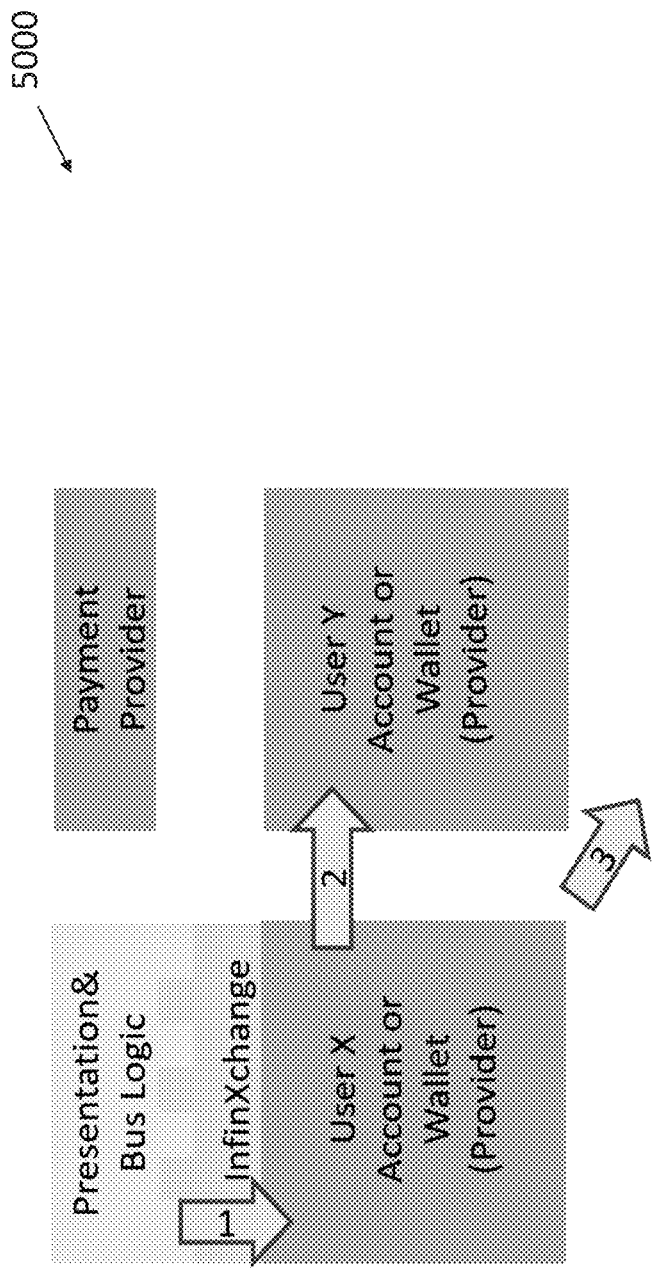
FIG. 15 is a schematic diagram of an example of a simple value transfer in accordance with disclosed implementations.

To understand application of Transaction Service Bus module 2002 to complex cross-ledger transfers, it is helpful to first explore how simple payment systems work in the context of the Transaction Service Bus module 2002. FIG. 15 schematically illustrates an example 5000 of a simple transfer. User X (sender) would like to send value to User Y (recipient) on the same ledger (for example, a PayPal transfer). First, the sender will propose a transfer by specifying the function (IPaymentService.Prepare) the recipient (by address) and the currency/amount to be sent (usually denoted in the amount the recipient expects to receive). The system will check the validity of the proposed payment (assess fees/gas, policy, valid recipient, sufficient funds) and will respond with one or more options (in many systems there is only one available option) regarding the amount which must be sent to achieve the desired delivery. If the transfer terms are acceptable for an option, the sender will initiate the transfer (Step 1, PaymentService.Submit) with a signed transaction (login, secret, etc). The system validates the transfer (Step 2, event IPaymentService.Initiated) and moves value by adjusting account balances (reducing source and increasing destination balances) while extracting a transfer fee (Step 3). On completion of the transaction, notification is sent (event IPaymentService.Completed). The new balances are reflected in the source and destination wallets.

Figure 16:
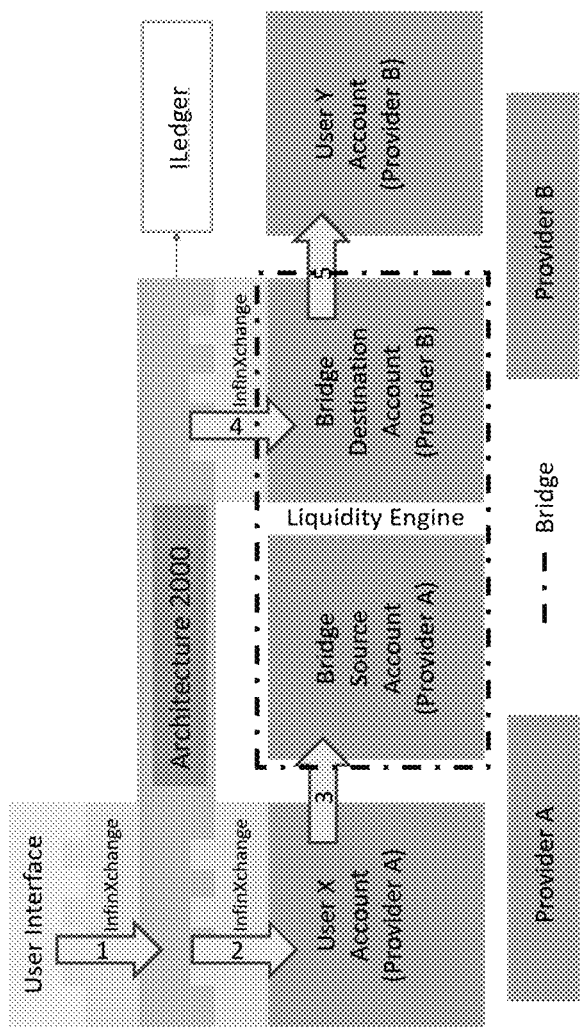
FIG. 16 is a schematic diagram of an example of a chained transaction in accordance with disclosed implementations.

A chained transaction in accordance with disclosed implementations may be initiated using these same functions in combination with novel elements of the disclosed implementations. FIG. 16 schematically illustrates an example 6000 of a chained transaction (including multiple sub-transactions to be accomplished in a specified order) in accordance with disclosed implementations. The example in FIG. 16 can use architecture 2000 of FIG. 12 to accomplish the transaction. Individual ledger transfers in the chain use methods consistent with a simple payment with coordinating activities managed by Chained Transfer Handler module 2004 of FIG. 12.

As shown in FIG. 16, the sender proposes a transfer (IPaymentService.Prepare) using the InfinXchange interface. In this example, user X desires to transfer value from and account on Provider A (a first DLT Network for example) user Y's Account on Provider B (a second DLT network for example). At step 1, the Route Planning Service module 2006 FIG. 12 looks for available paths by traversing the node graph (such as node graph 3000 of FIG. 13A) to identify Bridges that can provide a viable path between the source and destination networks, based on the bridge metadata, and obtaining fees for each leg of the transfer. There may be 0 to many paths available for facilitate the transfer. Various techniques (including artificial intelligence may be used to narrow the list of available options or to prioritize the possible paths. The paths can include all necessary InfinXchange interfaces and business logic derived from the bridge metadata.

The sender, or an automated algorithm, can select the desired path and initiate the desired transfer (IPaymentService.Submit). Chained Transfer Handler module 2004 writes the transaction to a ledger of System Transaction Ledger 2013 (FIG. 12) to ensure auditability and recoverability in the result of system failure. This record may be obfuscated using Zero Knowledge Proof techniques to provide immutability without compromising transaction privacy. Chained Transfer Handler module 2004 also publishes an event (IPaymentService.Initiated) to signal the transfer. Chained Transfer Handler module 2004 conveys the user's signing authority to execute a child transfer on the source ledger using the planned route by the IPaymentService.Submit function (Step 2) which includes traversal of dissimilar networks via one or more Bridges. On initiation of the sub transfer, an event is thrown (IPaymentService.Initiated) as this transfer is linked to the parent transaction in the external transaction ledger. On completion of the transfer to the source bridge account (IPaymentService.Completed), an event is thrown to mark the completion of the transfer signaling the handler to initiate the next part of the transaction. A transfer is initiated via the bridge (IBridgeService.Submit). On completion of the bridge transfer (IBridgeService.Completed), Chained Transfer Handler module 2004 initiates the transfer on the outbound ledger using IPaymentService.Submit (Step 4)) to deliver to the value to the destination account or another leg in the chain depending on the route. An event is thrown on the initiation of this transaction (IPaymentService.Initiated). This transaction is linked to the parent transaction in the external transaction ledger of Independent Transaction Ledger module 2012. The value is delivered to the destination account and an event is thrown (IPaymentService.Completed) at Step 5. As the last step in the chained sequence, and event is thrown signaling the completion of all transactions. All sub-transactions are recorded to the ledger of System Transaction ledger 2012.

Alternatively, a chained transfer can be initiated from an external system, skipping Step 1 and Step 2 of FIG. 16, by delivering value to a bridge source account with instructions for delivery to the destination. On receipt, the bridge account issues an IPaymentService.Completed transfer. The Chained Transfer Handler module 2004 reads this event and determines if there is a legitimate payment route. If a route is available, the chain is initiated with the funds held in escrow at the bridge source account. If the transfer succeeds, these funds are released. If the transfer fails, the funds may be returned to the source. If the source ledger supports smart contracts, the initiating transaction can leverage on-chain escrow methods to ensure atomicity of the transaction.

Figure 17:
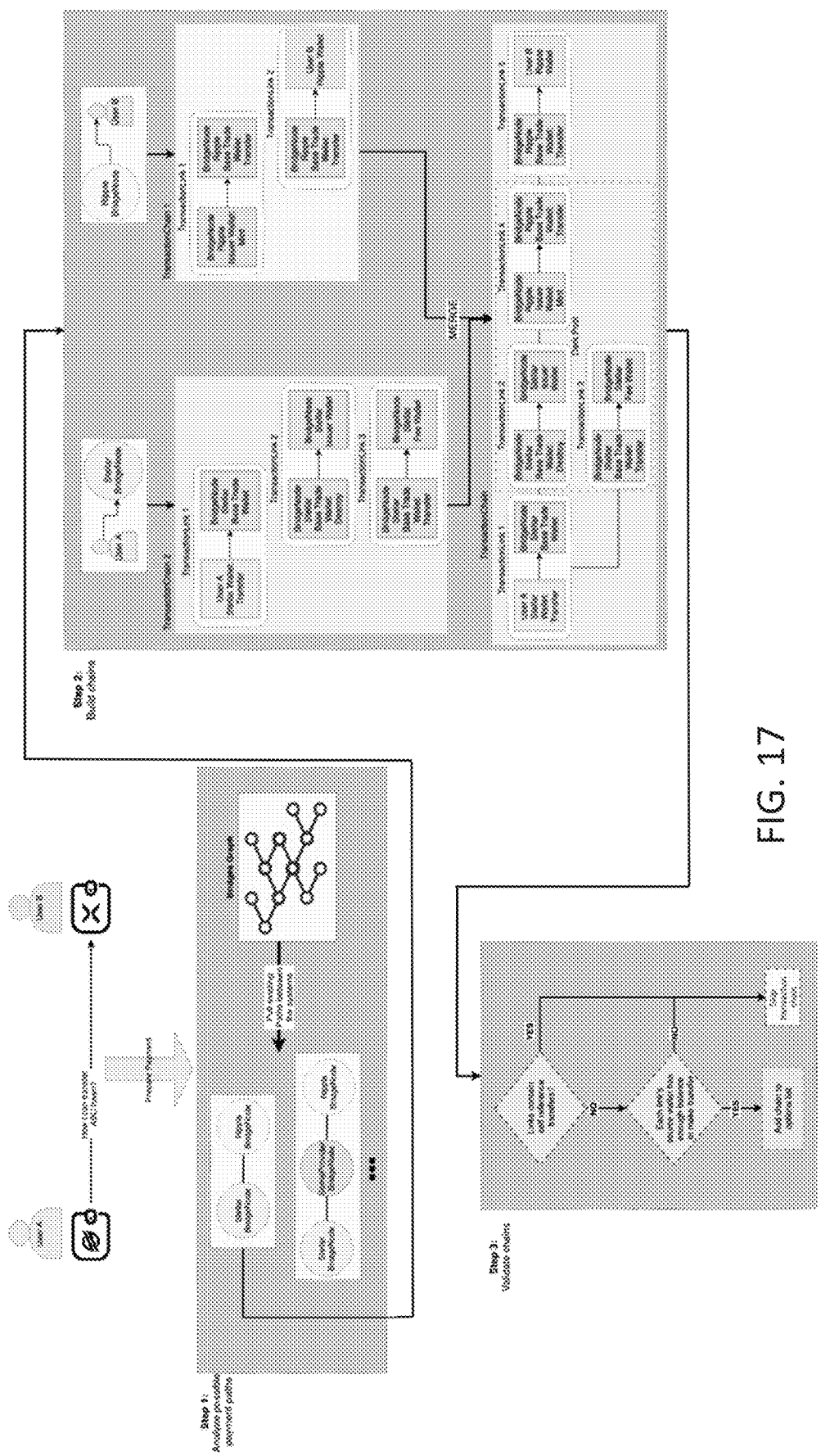
FIG. 17 is a schematic diagram of an example transaction chain building process in accordance with disclosed implementations.

FIG. 17 is a schematic illustration of an example transaction chain building process in accordance with disclosed implementations. The illustrated process can be accomplished by the architecture of FIG. 12. A Route Planning Service module 2006 in combination with InfinXchange™ wrappers, to identify optimal transmission paths across network nodes, given the transaction specified in a transaction data structure. In this example, the specified transaction is "transfer ABC token from User A node on Stellar DLT Systems to User B node on Ripple DLT System". A set of all available options, such as price, and expected delivery time can be specified by the transaction data structure. At Step 1, Route Planning Service module 2006 evaluates all possible routes and available bridges to execute the transfer by traversing the graph of all nodes and Bridges. Possible transaction paths are analyzed by reading bridge metadata for the relevant networks and builds a Bridge Graph that represents all connections between the source ledger (Steller in this example) and destination ledger (Ripple in this example) providers and tokens. The Bridge graph can include all relevant bridge metadata of the Bridges for the identified connections.

Route Planning Service module 2006 can apply a Breadth First Search (BFS) algorithm (a known graph traversal algorithm that traverses a graph layer-wise from a selected node) to find all paths and return a list of BridgeNodeChains, i.e., a list of possible paths for accomplishing the transaction. In this example, two possible paths are identified (TransactionChain 1 and TransactionChain 2). At Step 2, Route Planning Service module 2006 constructs the ultimate transaction path, based on the list and transactional requirements and conditions. For example, where the chain must deliver 1 ABC token to destination wallet and the sum of associated transmission fees equal 0.1 ABC token, the Source must transfer 1.1 ABC tokens. The ultimate transaction path can be constructed to consider various preferences and attributes, such as transaction fees, time for transaction confirmation, and the like.

FIG. 13A can be used to better illustrate the selection of paths and transaction chains. Recall that, in FIG. 13A, Graph 3000 has three DLT networks, each having at least one node. Transactions may occur within a network (e.g., A->B, Y->Z). However, in order to cross between networks, for example transact between nodes that are in different DLT networks, a bridge must be used. Without bridges, no path exists for transfer between, for example, nodes A and Z. To link the networks, bridging accounts B, M, and Y are created. Bridges are then set up to link these accounts. Using Bridge 1, a route between, for example A and Z, exists (A->B~1~Y->Z). A second route exists by linking through a third-party network (A->B~2~M~3~Y->Z). A route planner of Route Planning Service module 2006 traverses the network graph and generates these routes as potential routes. A user (or an automated service) can decide the best transfer path from the identified options based on preferences and other attributes.

Returning to FIG. 7, the ability to move value from one network or ledger to another may involve many potential paths and mechanisms or may have no viable path at all. When a user requests payment delivery, a set of all available options, their price, and expected delivery time must be generated in substantially real time. At Step 2 of FIG. 17, Route Planning Service module 2004 gathers all possible routes by evaluating all available bridges that can provide a path from a source node to a destination node. Transaction Service Bus When all abstract paths have been calculated, Route Planning Service module 2006 builds one or more transaction chains based on abstract paths. There are at least two ways to build the chains, start building from Destination (default), or from Source. When starting from Destination to Source, Route Planning Service module 2006 begins with destination conditions as the fixed point. When starting with the source node as the fixed parameter, Route Planning Service module 2006 determines the value the destination node will receive if the transfer begins with 1 ABC. Route Planning Service module 2006 starts building transaction links from source and accumulates all fees and exchanges through the path. For example, if all fees equal 0.1 ABC token, the receiver will get 0.9 ABC token in the end. Route Planning Service module 2006 then builds an abstract path to the real chain based on, for example, the following rules:

Route Planning Service module 2006 then selects all path chains and merges them into the single final transaction chain by removing duplicate links. As shown in FIG. 17, the transaction chain includes TransactionLink 1, TransactionLink 2, TransactionLink 3, TransactionLink 4, and TransactionLink 5. At Step 3 of FIG. 17, a TransactionValidationService validates that the transaction paths can be executed, for example, by checking whether each link source wallet in a path has sufficient balance to submit the transaction and/or checking for self-referencing chains, i.e., where the same node occurs more than once in a chain. (A Policy Engine can verify regulatory compliance at each transfer node. For example, the system and methods described in US Published Patent Application No. US20190164151 A1 can be used to verify regulatory compliance.) Each viable transaction chain may involve fees and exchanges and will have an estimated delivery time. The price of a proposed transfer and the delivery time can be calculated to present to the user prior to user approval of a transfer action.

During a transfer in the chain of sub-transactions, it is possible that a network failure occurs, or the transfer is cancelled (if allowed) prior to completion. In this case a rollback is required. In cases where intermediate fees are charged or exchanges are performed, it may not be possible to reverse the transaction without a loss in value. For these cases, a user may exercise choice to restart the transfer chain to proceed to completion, rollback the transfer, or abandon the transaction by claiming the value in its current state. A successful chain of four sub-transactions (to accomplish a

| Case | Description | Transaction Chain |
| --- | --- | --- |
| Bridge node -> Bridge node | based on Bridge node configuration, the builder may return either zero link or several. If bridge node currencies are different, and bridge node contains issuer wallet, transaction builder adds 2 links: issue token 1 from issuer to base trade, exchange token, destroy token 2 to issuer. | Link 1: Bridge Issuer wallet → Bridge Base Trade wallet (hidden for user) Link 2: Bridge Base Trade wallet → Bridge Issuer wallet (hidden for user) |
| Bridge node -> Destination wallet | based on Bridge node configuration, the builder may return either one link or several. The first link is a transfer from Bridge Base trade wallet to destination wallet. If Bridge node contains Issuer wallet, transaction chain builder adds a link issue tokens. This link goes as a Dark Pool and hidden for user If Bridge node contains Fee account, transaction chain builder adds a link with transfer fee from bridge base trade account to the fee account. This link goes as a Dark Pool and hidden for user | Link 1: Bridge Base Trade wallet → Destination wallet Link 2: Bridge Issuer wallet → Bridge Base Trade wallet (hidden for user) Link3: Bridge Base Trade wallet → Bridge Fee wallet (hidden for user) |
| Source wallet -> Bridge node | based on Bridge node configuration, the builder may return either one link or several. The first link is a transfer from user to Bridge Base trade wallet. If Bridge node contains Issuer wallet, transaction chain builder adds a link to the chain to destroy tokens. This link goes as a Dark Pool and hidden for user If Bridge node contains Fee account, transaction chain builder adds a link with transfer fee from base trade account to the fee account. This link goes as a Dark Pool and hidden for user | Link 1: Source wallet → Bridge Base Trade wallet Link2: Bridge Base Trade wallet → Bridge Issuer wallet (hidden for user) Link3: Bridge Base Trade wallet → Bridge Fee wallet (hidden for user) |
| Source wallet -> Destination wallet | this is a case (empty bridge node chain) when the transfer goes within one ledger, so this transfer doesn't require bridges. Adds single link in a chain. | Source wallet → Destination wallet | desired transfer transaction) is illustrated at 8002 in FIG. 18. All four sub transactions (8002a, 8002b, 8002c, and 8002d) are successful.

Figure 18:
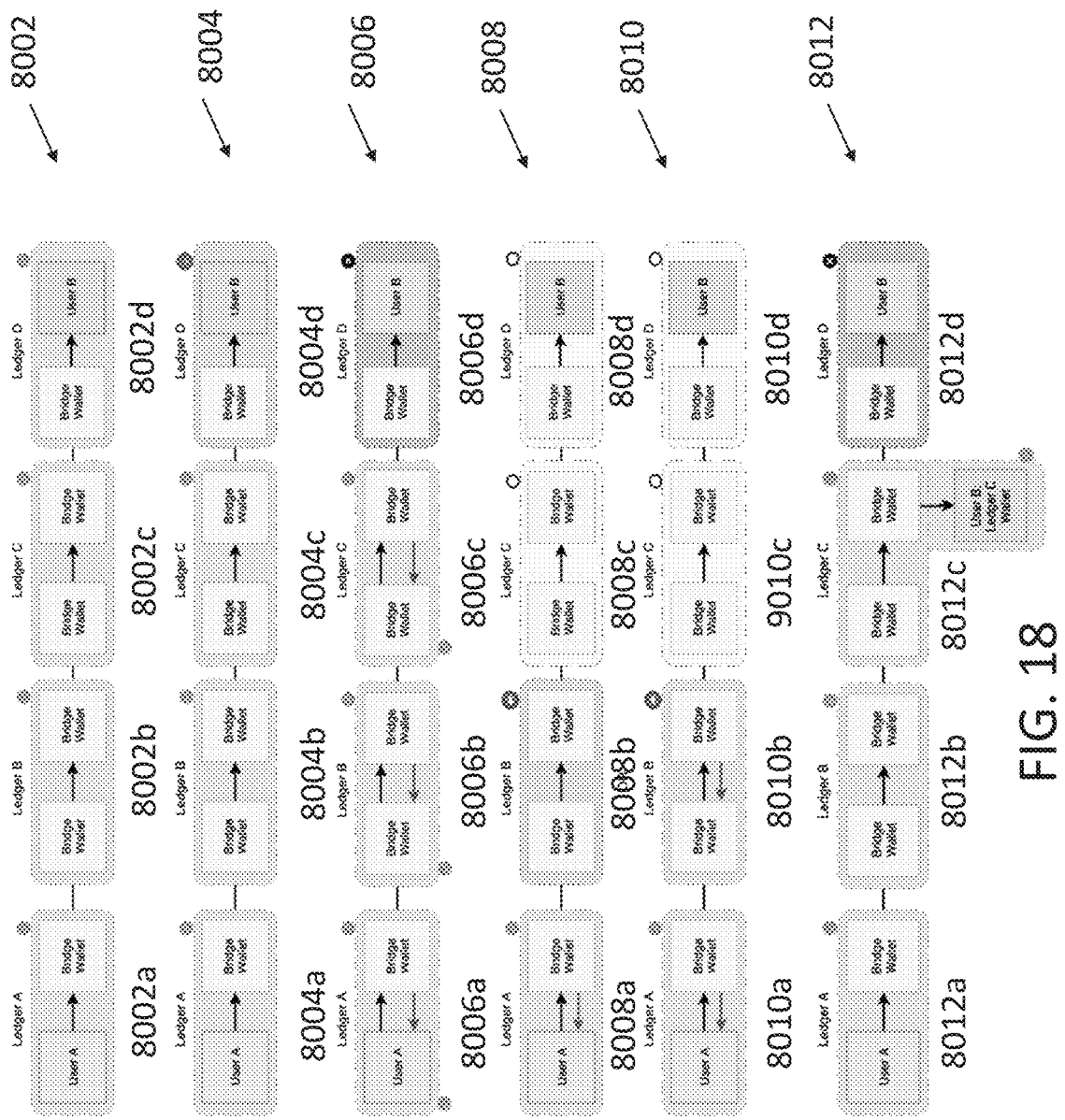
FIG. 18 is a schematic diagram of chained transfers in accordance with disclosed implementations.
Figure 19A:
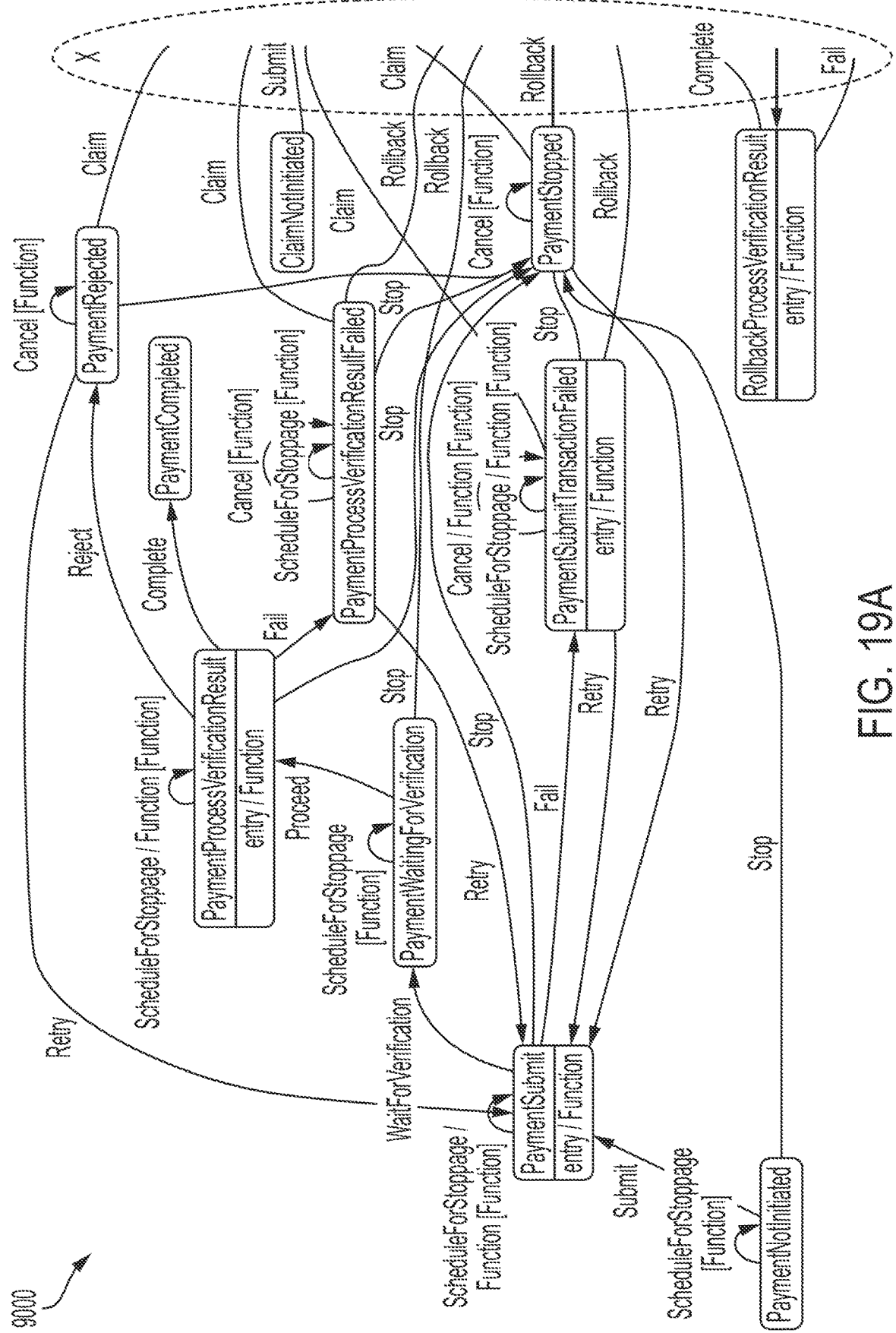
FIGS. 19A and 19B, in combination, illustrate an example of state diagram for chained transfers in accordance with disclosed implementations.
Figure 19B:
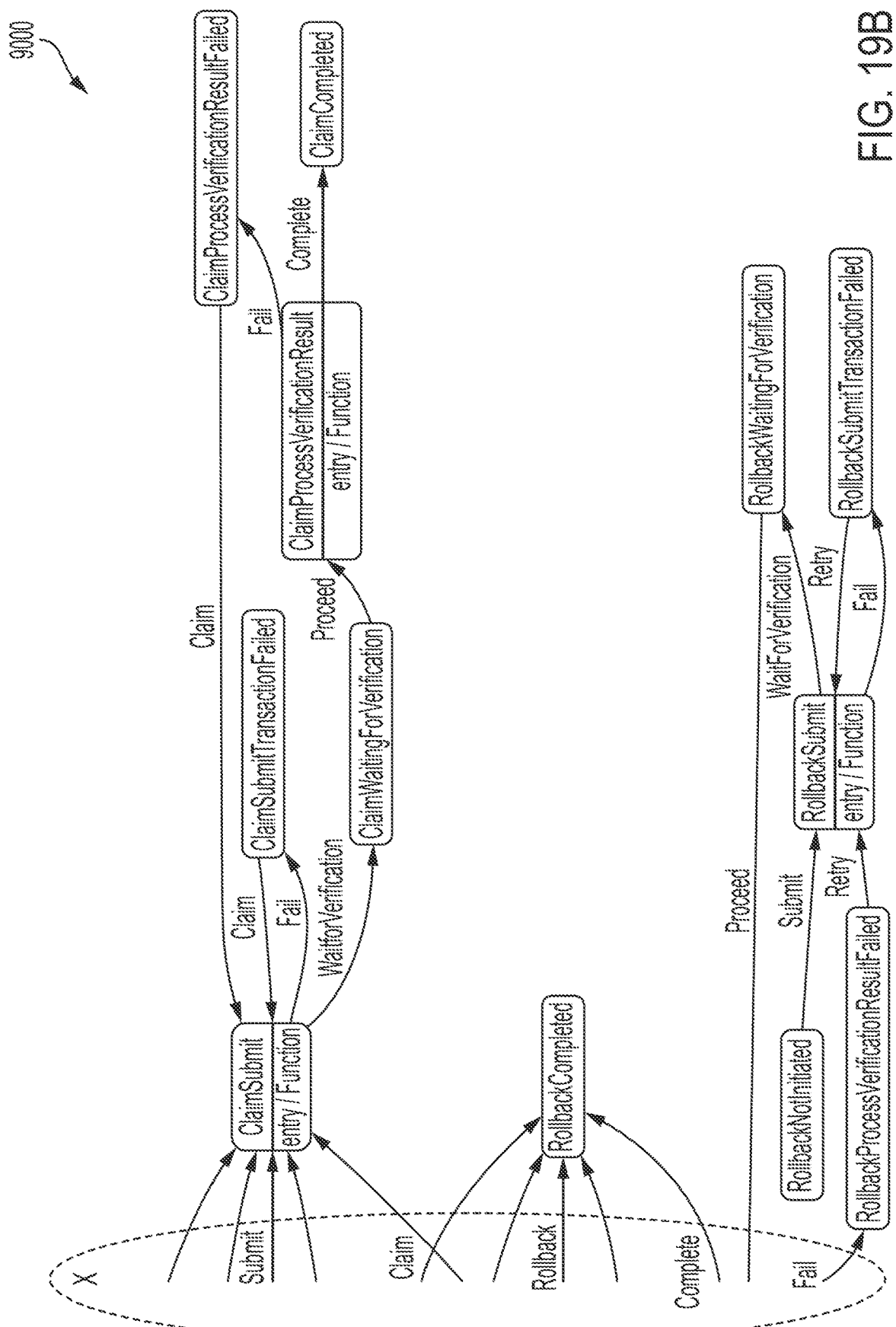

However, depending on the configuration of the bridge, upon a transaction failure, the system may automatically conduct a restart to deliver the value or may halt and await user input. 8004 of FIG. 18 illustrates a chained transaction in which sub transaction 8004d has failed. Depending on the configuration, upon a failure, the chain may automatically initiate a rollback transaction. Rollback transactions are only possible if each bridge used in a route are two-way bridges capable of supporting transactions in both directions. 8006 of FIG. 18 illustrates a rollback transaction. At 8006, sub transaction 8006d has failed and this all sub transactions 8006a, 8006b, and 8006c are "reversed" by accomplishing a reverse sub transaction for each of these sub transactions. Further, as shown at 8008 and 8010, transactions may be cancelled en route. In transaction 8008, sub transaction 8008b has been cancelled prior to execution and thus sub transaction 8008a has been reversed. Alternatively, at 8010, sub transaction 8010b has been cancelled after execution and sub transactions 9010a and 8010b are both reversed. Alternatively, if the transaction initiator has the means to receive value via an intermediate ledger, the value may be claimed directly from a halted transaction as shown at 8012. All sub transactions, including reversal transactions, are recorded on system transaction ledger module 2012. FIGS. 9A and B, in combination, illustrate an example of state diagram 9000 for chained transfers.

Each viable route may involve fees and exchanges and will have an estimated delivery time. The price of a proposed transfer must be calculated to present to the user to support a transfer action. Chained Transfer Handler 2004 is designed to provide a manageable alternative to Atomicity (A) and to deliver Consistency (C), Isolation (I), and Durability (D) consistent with ACID (see https://en.wikipedia.org/wiki/ACID_(computer_science) payment delivery). Chained Transfer Handler module 2004 orchestrates cross ledger payments by providing the following functions: ledger interoperability, route planning, price and fee discovery, transaction management, transaction state, and logging. Chained Transfer Handler module 2004 ensures high reliability end-to-end transfer across networks by:

- publishing the proposed end-to-end transaction and all sub transactions to a ledger (such as System Transaction Ledger 2012), with zero knowledge proofs, as they execute for traceability and reliability;
- sequencing transfers using an interoperability framework that leverages transfer capabilities in each network the transaction traverses; and
- ensuring each transaction is executed successfully (or rollback) to deliver value successfully.

Isolation (I) is provided via the common IPaymentService plugin which isolates each individual ledger transaction as a component in a larger flow. This plugin framework provides a common model for processing transactions across dissimilar ledgers. Transaction Management: Transaction management provides for the Durability (D) of chained payments. Chained Transfer Handler module 2004 manages each step of a complex payment sequence to ensure it is executed even in the face of an outage or payment network failure. This component handles parallel or series transactions and executes payment and bridging transactions.

Due to irreversibility of certain transactions (because of fees), long delivery timeframes and frequently changing market conditions that characterize certain chained payments, Atomicity (A) cannot be guaranteed. To provide for slippage (changes in exchange rates or fees from the initiation of a transaction until its completion), the Chained Transfer Handler module 2004 can freeze a transaction in the event of a significant change to allow the user to weigh in regarding the willingness to continue. At this point the transaction may be rolled back (at the expense of fees), the value may be claimed in its existing form, or the transaction may be restarted to proceed to completion (with the user accepting the changed terms).

Since chained transactions may involve more than one ledger, none of the individual ledgers involved will contain end to end traceability of the transaction. To ensure Consistency (C), an overarching ledger is maintained by Independent Transaction Ledger module 2012 to track the overall transaction as well as links to each of the sub-transactions. Chained transfers may occur in series or parallel depending on Bridge configuration. Parallel payments are fastest but may require rollback locks and hedging due to risks in time latency of inbound deliveries. Series deliveries may require significant use of slippage management and require locking of outbound funds to support delays in inbound transactions.

When operating in series, Bridges await verification of the completion (IPayment.Complete event) of the initiating transaction (inbound) prior to initiating the chained transaction (outbound). When operating in parallel, Outbound transactions may initiate immediately after verification of initiation (IPayment.Initiated event) of an Inbound transaction. For parallel operations, the Bridge operator takes delivery risk if the Inbound (and all intermediate) transactions are cancelled or rolled back. Often the Bridge Operator will only allow parallel operations if the inbound network does not allow cancellation or rollback. Alternatively, the Bridge Operator may require collateral or charge a large fee to compensate for delivery risk. For series operations, the initiator may experience slippage risk, that is, a change in price for delivery from the initial terms presented on the initiation of the transaction. For example, downstream networks fees or exchange rates may have changed from the time the transaction is initiated. The Bridge Operator may provide a price guarantee (no slippage) but will often build in a fee to compensate for market changes or hedging strategies.

As is apparent above, in addition to providing a path for transactions across dissimilar network, Bridges can have various logical functions. A deposit is a special example of a bridging function. It involves a Peg linking deposited funds to an equivalent amount of tokens (Hypothecated Assets or IOUs) which are delivered to the user's internal account. IOUs can be transferred to other users or traded for assets via centralized or decentralized exchanges. These tokens can be redeemed (settled) for the value in the counterparty account by using the opposite flow, that is, a withdrawal.

Account balances in the Counterparty pool should exactly match the total number of internal tokens in circulation. Both balances should be published to users. Some networks support token creation and destruction, whereas others require movement in and out circulation via cold wallets.

FIG. 10 schematically illustrates an example of the operations for a Bridge accomplishing a hypothecation transfer. At Step 1, value is sent sent from Source Wallet to Custody Wallet (Bridge Inbound) using an external provider (e.g., OOB, Cascade, PayPal, Ethereum). At Step 2, and equivalent number of IOUs (a digital version of the deposited amount) are issued from Issuer wallet and sent to the Base wallet. At Step 3, Base wallet (Bridge Outbound) enacts IPayment.Transfer send value to Destination Wallet on Internal Provider. This pattern requires the Chained Transfer Handler module 2004 to have the means to detect and attribute transactions on the source ledger and execute transactions from the Issuer Wallet and Base Wallet. Access to this authority can be granted at Bridge setup. Note that it is possible to skip Step 2 and send directly from Issuer Wallet to Destination Wallet.

Figure 21:
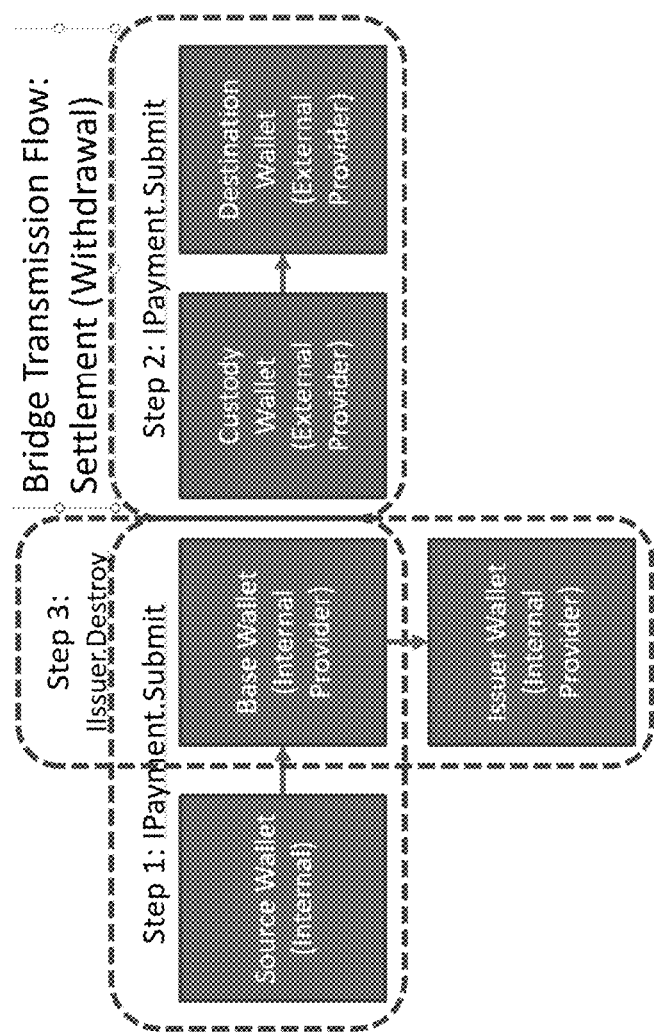
FIG. 21 schematically illustrates an example of the operations for a Bridge accomplishing a settlement transfer in accordance with disclosed implementations.

Settlement is the reverse of a Hypothecation transfer. When the user desires to remove value from a ledger and return the value to its original form, a transfer is initiated that traverses a settlement bridge. FIG. 21 schematically illustrates an example of the operation of operations for a Bridge accomplishing a settlement transfer. At Step 1, value is sent from Source Wallet to Base Account (Bridge Inbound) using External provider (e.g., OOB, Cascade, PayPal. At Step 2, Custody Wallet (Bridge Outbound) enacts IGateway Payment to send value to Destination Wallet. At Step 3, in response to completion of the previous step, an equivalent number of IOUs (digital version of the settlement amount) are burned (i.e., destroyed) from the Base (escrow) Wallet. This pattern requires the Chained Transfer Handler module 2004 to have the means to detect and attribute transactions on the source ledger and execute transactions from the Custody Wallet, and burn tokens from the Base Wallet. Access to this authority can be granted as part of the Bridge setup. Also, it is possible to skip Step 3 and receive directly to the Issuer Wallet from the Source Wallet if the authority exists to reverse the burn if the transaction fails.

Cross Ledger Transmutation can be used for Multi-Ledger issuances. For example, it is used when the official record of ownership is separate from the ledgers being used for transfer, or is the official record is the sum of ownership records on affected ledgers. With an InfinXchange™ summing mechanism that exists above specific ledgers, transmutation permits tokens to be issued on multiple ledgers and/or provides a means by which tokens issued on one ledger can "flow" to another. As tokens move from ledger to ledger, the total number of tokens in circulation remains constant while the ownership record moves from ledger to ledger. This type of Bridge couples a withdrawal and deposit function. By removing tokens from one ledger at the same time tokens are introduced into circulation in another, the total number of tokens remains constant. Funds exiting a ledger are sent to the Source Ledger Base Wallet. This transfer may also be an escrow transaction placing a hold on the tokens without moving them. An equivalent number of tokens are issued into circulation on the Destination Ledger from the Issuer (wallet, account, or smart contract) or Cold Wallet to the Outbound Wallet on Provider B for delivery to the destination. On successful delivery, the IIssuer.Destroy function called on the source ledger removing the tokens from circulation.

Out-Of-Band Transfer module 2104 provides out of band (OOB) processing in cases where value transfer path legs cannot be fully automated within the system. Interfaces are provided to enable third parties to signal and provide data to applicant's system to facilitate processing execution. For example, in the case in which Bridges may only support a one-way flow of funds across networks, a fund imbalance may accumulate and OOB transactions may be required to restore balance. Managing OOB time lags and proper prepositioning of funds in the Outbound account is a logistics problem with firmly established mathematical models for control. Price Discovery is facilitated through the operation of the Price and Liquidity module 2010 (FIG. 12). This module may adjust price through market functions to maintain a balance between Inbound and Outbound account levels. External markets can be used to replenish liquidity. Darkpool owners (those who contribute assets to the pool) receive income from fees linked to pool usage. The Price and Liquidity module 2010 is designed to manage liquidity between ecosystems, currencies, asset exchanges. The Price and Liquidity module 2010 applies market making algorithms to manage liquidity. The Price and Liquidity module 2010 may manage the cost of transfer based on the balance of resources on both sides of Darkpool. It drives up the cost of sustained mismatch in the flow of capital. A sustained imbalance in resource flow between A and B will result in increase in price to move from A->B and decrease B->A. The bigger the mismatch the greater the revenue of the model. Users can "invest" in mismatch to bring liquidity where needed.

Liquidity Darkpools can also be used to facilitate transfers between or within ecosystems when currency exchanges are involved. The chained flow can be repeated across many providers including available currency exchanges to provide a path for any flow of value and use external liquidity. Currency exchange can occur via Price and Liquidity module 2010. Process can be repeated and use counterparty exchange accounts to maximize liquidity.

Figure 22:
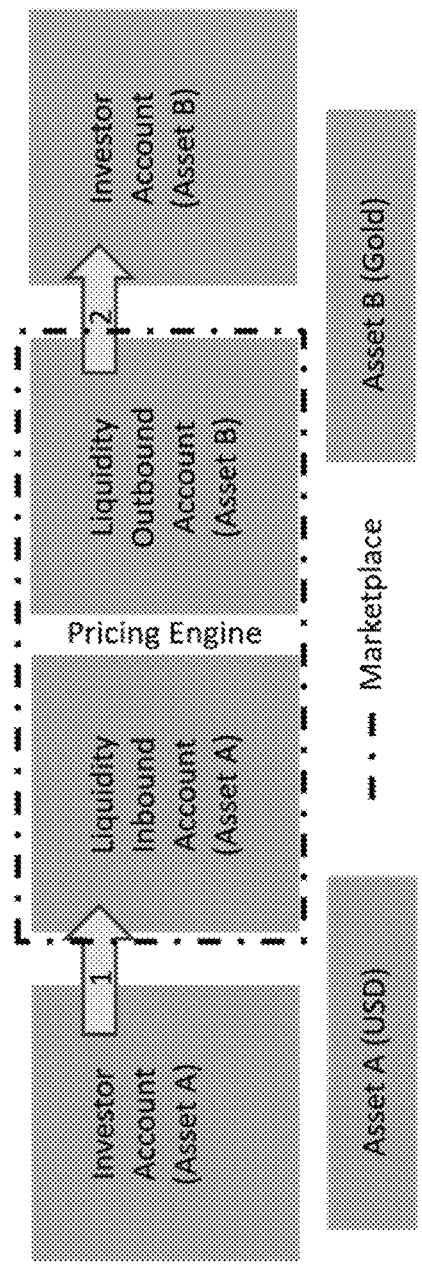
FIG. 22 illustrates a pricing mechanism for an asset pair in accordance with disclosed implementations.

The above-noted technical platforms and data structures can be used to increase effectiveness and throughput of computer trading platforms. Transaction efficiency can be measured as: 1) a change in price resulting from the transaction; 2) time to complete the transaction; or 3) the total size of a transaction that can be supported. Markets are said to be illiquid if a request to exchange value for another form of value cannot be met in a short period of time without significantly changing the price ratio of one asset to the other asset. For example, as illustrated in FIG. 22, investors may desire to purchase gold (Asset B) for USD (Asset A) from a marketplace or exchange. The marketplace accepts USD in exchange for Gold at a price set by a pricing engine. A steady inflow of Gold purchases results in the growth in available USD and a corresponding decrease in the pool of available gold. As the Outbound Account supply of available gold decreases, its liquidity (the ability to support a large order at any price) decreases. If increased demand for gold continues and the price of the exchange does not change, the supply of gold in the Destination pool will eventually run out resulting in a total loss of liquidity.

Several factors are required to sustain the liquidity of an asset in a marketplace: Availability of investors with Asset A with demand for Asset B; an adequate supply of Asset B in the marketplace to meet demand; effective pricing consistent with the intrinsic value of Asset B in order to match supply with demand; and effective and timely ownership transfer so that Asset B is available unencumbered for use. More directly, a liquid market will price efficiently to match supply/demand, and settle quickly to permit use of value.

Figure 23:
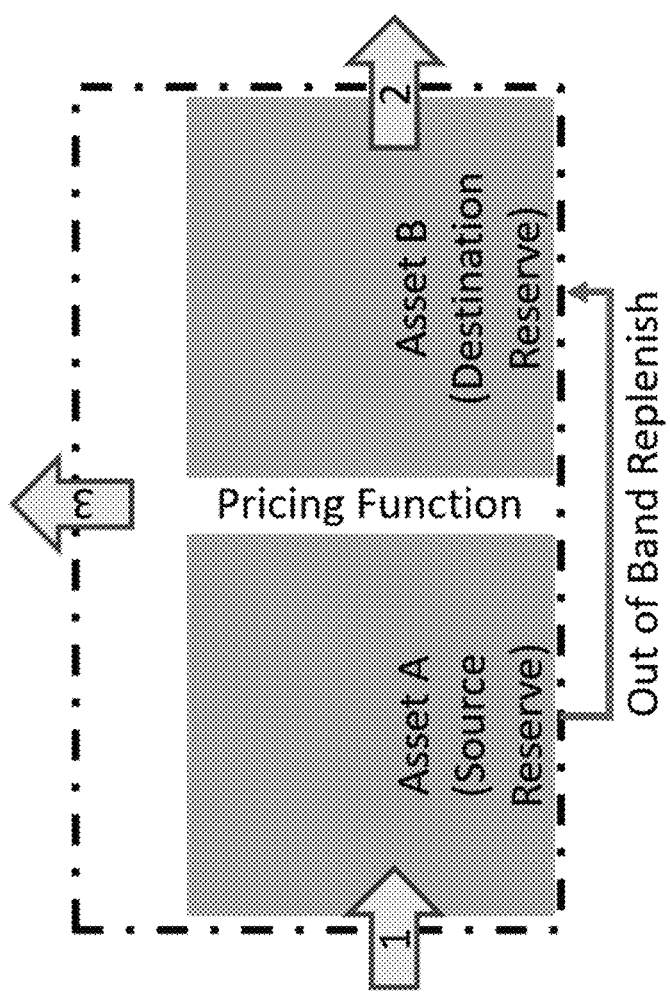
FIG. 23 illustrates the basic elements of a conventional system supporting the liquidity between a pair of assets in accordance with disclosed implementations.

FIG. 23 illustrates the basic elements of a conventional system supporting the liquidity between a pair of assets. The system can: support a means to request an amount of Asset B in exchange for Asset A at a specified price (ratio of units of Asset A/per unit of Asset B); include the means to deliver Asset B on request (usually a pool of assets); and accept delivery of Asset A in exchange for asset B. Optionally the system may: charge a fee for the service and require a mechanism to replenish the available pool of Asset B using the accumulation of Asset A through use of the liquidity mechanism.

The central benefit of the liquidity function is the translation of Asset A to Asset B. The Source and Destination Reserve may be different currencies, counterparties, networks, asset types, jurisdictions, etc. The value of liquidity services is inversely proportional to the ease with which asset value can be transformed (exchanged) or transferred from the Source to the Destination using alternative means. If assets can be moved freely, instantly, reliably, conveniently, and without degradation using alternative means, the liquidity function will have no utility and will not be able to command a fee. The extent to which alternative translations are expensive, slow, insecure, or inconvenient determines the utility and profitability of the function.

If asset value always flows in one direction and there is no balance between the flows, sustained operations will require an out of band replenishment model to sustain the flow. The security and cost of this out of band process will affect the profitability of the model. Balanced flows, that is value flows where the value moving from source to destination is matched with an equivalent flow in the opposite direction, are most desirable as they avoid the need for out of band replenishment. The system is in local equilibrium when the ration of the reserves for both assets match the desired target.

Figure 25:
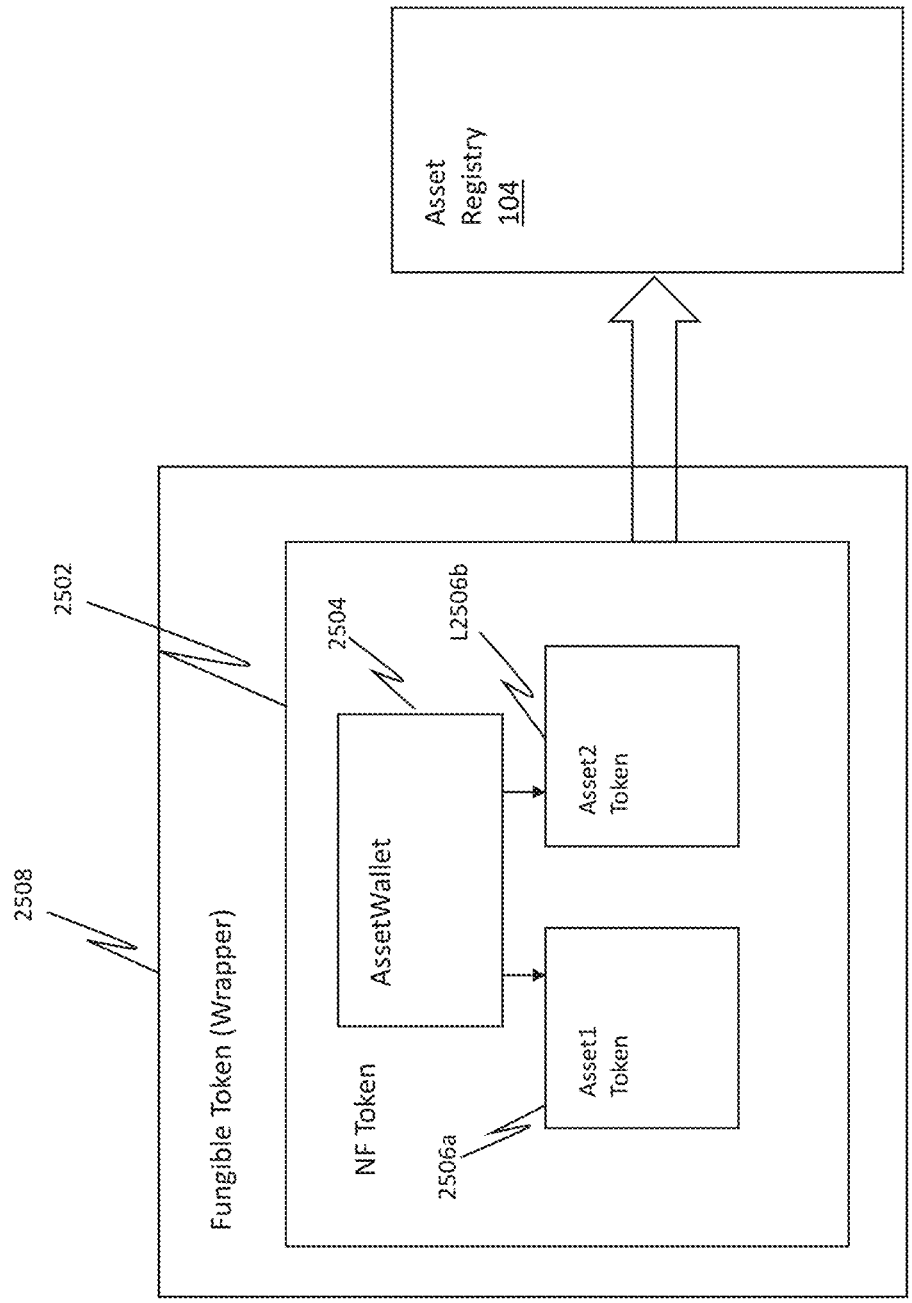
FIG. 25 illustrates the data structure defining an asset token in accordance with disclosed implementations.

FIG. 25 schematically illustrates the data structure defining an asset token. The asset token of FIG. 25 can use the token structure described above with respect to FIGS. 1-8, where tokens own wallets, which in turn owns tokens in a recursive manner. Implementations can utilize DLT technology to tokenize a class of assets that comprises an asset pair. A class member can be a non-fungible asset token 2502 that owns wallet 2504 holding tokens 2506a and 2506b representing assets on each side of the asset pair. Non-fungible token 2502 is "wrapped" in fungible token 25008 (for example, fungible token can implement the IAssetFund interface described above). Fungible token 2508 thus can represent ownership of underlying non-fungible asset token 2502. The holder of the fungible token 2508 (the "parent token") may obtain a dividend reflecting revenue generated by providing liquidity between the pair. Non-fungible token 2502 and asset tokens 2506a and 2506b can be registered in Asset registry 104 (see FIG. 1) in the manner described above.

Tokens similar to non-fungible token 2502 are referred to as "Liquidity Tokens" herein. Tokens such as fungible token 2508 are referred to herein as "Wrapped Liquidity Tokens" and may be transferred, in whole or in part (by selling shares in the Wrapped Liquidity Token), via an exchange implemented on a networked computing platform as described above. For example, Wrapped Liquidity Tokens can be transacted on a networked trading platform in a manner similar to the techniques described above with respect to FIG. 1 and FIG. 12.

Figure 26:
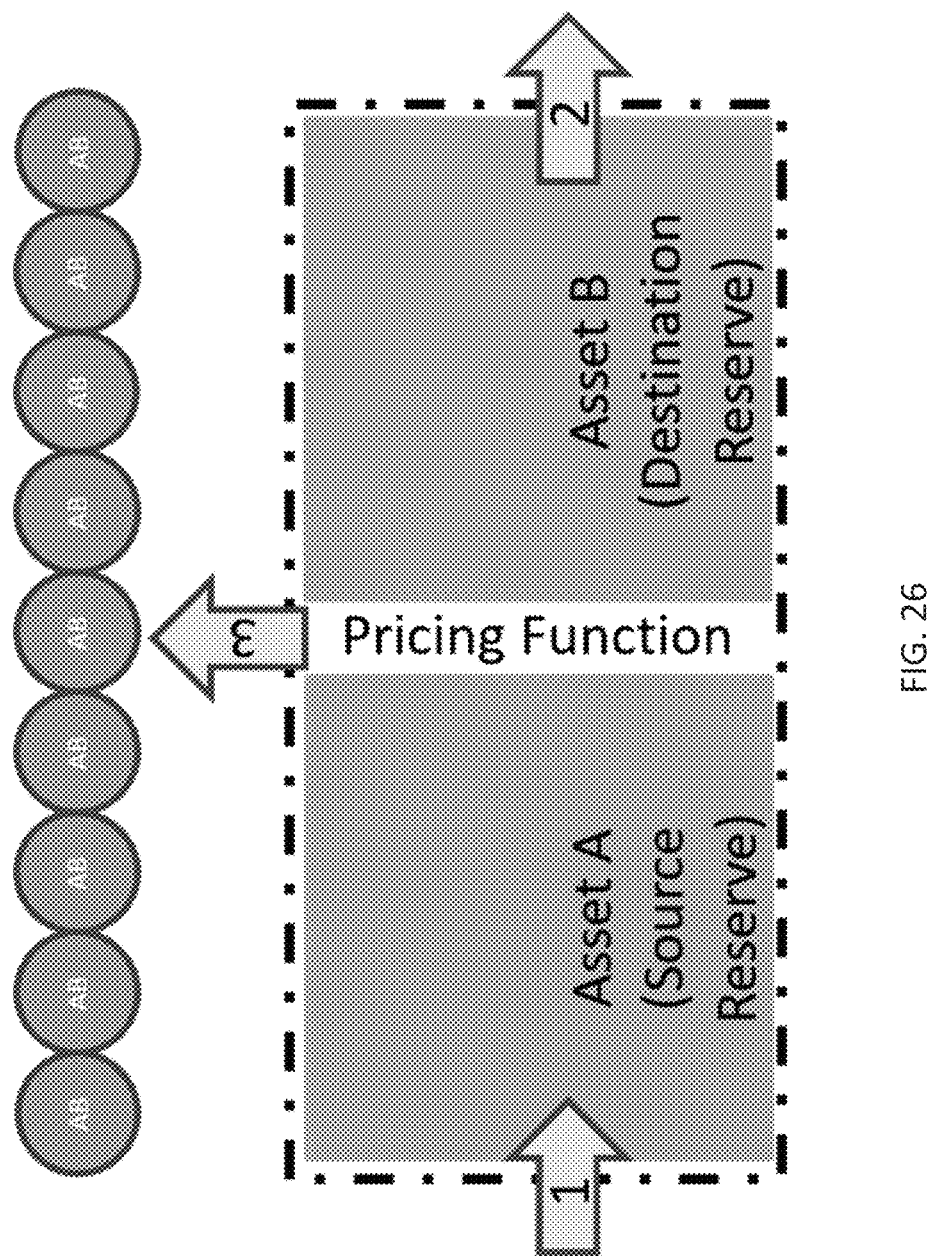
FIG. 26 illustrates a mechanism for providing liquidity to a wrapped liquidity token in accordance with disclosed implementations

As illustrated in FIG. 26, price of a Wrapped Liquidity Token (AB) will depend on the value of the underlying assets and the revenue produced by the underlying source reserve, i.e. "liquidity pool." Greater demand for liquidity between a pair will increase the dividends paid to the pair's liquidity token holders and, in turn, create more demand for the Wrapped Liquidity Token.

An increase in demand for an asset pair's liquidity token will result in a net inflow of capital to the ecosystem. This inflow of capital creates an imbalance between the cash and token reserves in the liquidity pool. Using the Elastic Securitization technique disclosed above, inflow of capital can be used to increase the underlying asset pool. Using a smart contract (or other algorithm) as a pricing function, when the cash in the liquidity pool held in reserve hits a threshold (reflecting increased demand in the liquidity function), it can be moved to the broader underlying pool to provide to meet redemption demands or to buy assets required for the liquidity pair. The resulting increase in cash in the source reserve helps increase the overall liquidity of the ecosystem.

As shown in FIG. 26, a liquidity pool can be created for the Liquidity token—using an arrangement similar to the underlying liquidity pool and the pricing function of FIG. 23. This liquidity pool may be part of the portfolio and is used to manage liquidity. It helps govern the net inflow and outflow of capital to the system. As shown in FIG. 26, to configure a liquidity token, a non-fungible asset token (2502 in FIG. 25) is created with source and destination accounts as described above, including the pricing function and fee structure. The asset token is wrapped in fungible token (2508 of FIG. 25) to permit investors to invest in a liquidity asset. Elastic securitization rules allow investment to flow to/from assets to meet demand.

Because each pair requiring liquidity has its own liquidity token, a self-balancing liquidity system can be formed across an ecosystem of asset pairs. As the need for liquidity decreases for one pair, its dividends will drop, decreasing investor demand for the liquidity token for that pair. This will result in a net outflow of capital from that pairs liquidity pool. Yield seeking investors will invest their capital on other pairs whose fees outpace the market. In this way, capital flows to the greatest demand for liquidity, resulting in a self-balancing system. Liquidity tokens can be bundled into a parent fund token which then can be wrapped in a fungible token, as described above, to allow shares of the fund to be sold and the holder to own an interest in the value in the underlying wallets and revenue generated from fees.

Liquidity tokens can be used in conjunction with darkpools (privately organized forums and exchanges) to facilitate and automate transfers of value between ecosystems using Bridges and the platform disclosed in connection with FIG. 12, for example. Liquidity tokens used in conjunction with the chained transfer technology and associated bridges provides the means to fund transfers of value between ecosystems. Darkpools generate value through fees, market making, or both. As income producing portfolios, they can be owned by third parties or traded as a security token. Darkpools represent a just-in-time supply chain management solution to optimize transient flow against slower, internal replenish processes.

A liquidity pricing function manages liquidity between assets, ecosystems, and exchanges. The engine manages the cost of transfer needed to balance resources. It drives up the cost of sustained mismatch in the flow of assets, by incenting users to "invest" in the mismatch and drive liquidity where it is needed. One implementation of a liquidity pricing function monitors the relative balance between source and destination reserve balances and adjusts price and the rate of change of price based on recent pricing history, an anchor value based on external information, fees associated with replenishment, and the amount of value that is being moved. The liquidity pricing function also determines the spread (difference between min bid and ask order price based on market conditions and volatility.

Figure 24:
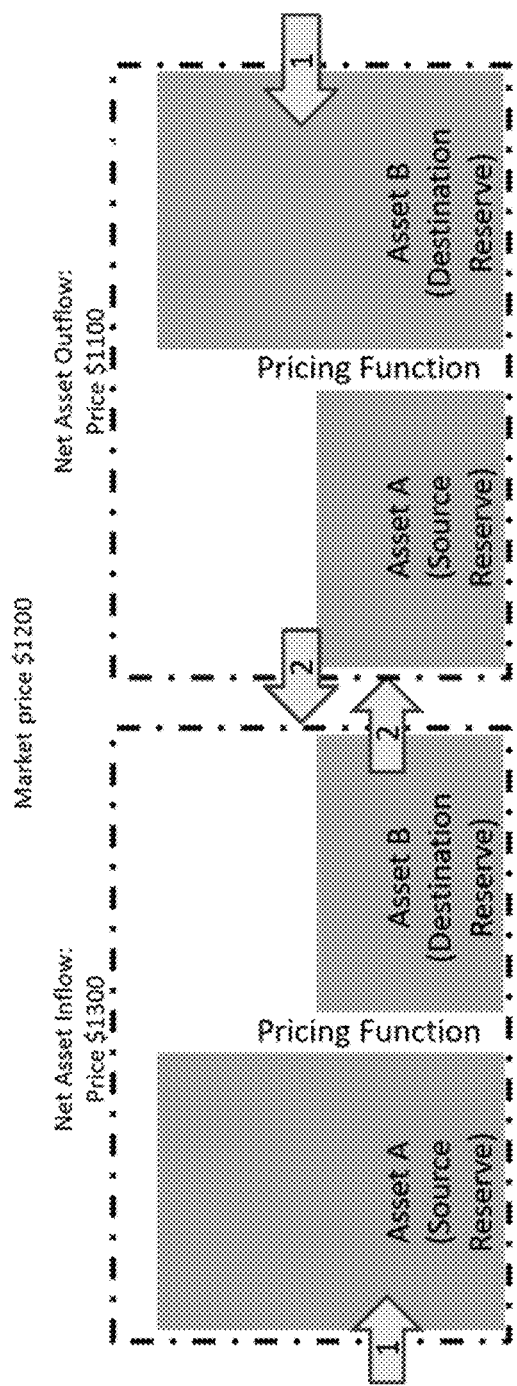
FIG. 24 illustrates a pricing function in accordance with disclosed implementations.

FIG. 24 illustrates a pricing function. The disclosed pricing function incorporates a number of factors including: imbalance between source and destination reserve accounts, current market conditions and activity, external pricing, asset par value, and other factors. Pricing algorithms build in protective measures against market manipulation by widening spreads and using other techniques. One implementation of the pricing function manages price by placing orders into an exchange. Another implementation manages price directly through an algorithm that sets price directly in response to a liquidity request.

With a dynamic pricing function which increases the price as resources draw down, the liquidity engine will increase the price of Asset B (in terms of Asset A) until market equilibrium is reached. In the example illustrated in FIG. 24, the demand for Asset B results in a decrease in Asset B reserve pool and an increased equilibrium price. A net demand in the reverse direction will drive price down. The extent to which equilibrium price deviates from the prevailing market price is the price of liquidity. The dynamic pricing function is designed to ensure reserve resources never run out in the event of a sudden imbalance in value flow. The dynamic pricing function can be driven by a Proportional Integral Derivative (PID) controller to dynamically adjust price according to sustained liquidity demands.

For imbalanced flows, it may be necessary to move value OOB from one reserve to another. OOB transfer may involve manual movement of funds, the use of exchanges, or other transfer channels independent of main transfer channels as described above. Often, OOB transactions may involve longer delivery times and may be costly. The time and expense of these transfers defines the parameters of a traditional logistics problem—deciding the amount of value to preposition based on the variability of demand and the time and expense to replenish.

Revenue from operating a liquidity reserve is generated by two sources: 1) fees on the transaction; and 2) the spread (the difference in exchange price for a flow from the reverse flow). Fees may be adjusted to maximize revenue. If the fees are too high the channel won't be used resulting in no revenue. If fees are too low, opportunity may be lost. Similar logic applies to the market making function associated with the spread.

Additional alternative structural and functional designs may be implemented for creating tokenized structures and conducting asset management functions. Thus, while implementations and examples have been illustrated and described, it is to be understood that the invention is not limited to the precise construction and components disclosed herein. Various modifications, changes and variations may be made in the arrangement, operation and details of the method and apparatus disclosed herein without departing from the spirit and scope of the invention defined in the appended claims.

What is claimed:

1. A method for creating a tokenized pairs of assets, the method comprising:
    creating, by at least one computer processor executing instructions on a stored memory, a liquidity token, wherein the liquidity token is a digital token representing a liquidity function for an asset pair and beneficial ownership of revenues produced by the liquidity function and ownership of the asset pair required to support liquidity;
    assigning, by the at least one computer processor, to the liquidity token a smart contract wallet;
    creating, by the at least one computer processor, asset tokens, wherein each asset token is a non-fungible digital token representing each asset pool in an asset pair in accordance with a class definition, and wherein each non-fungible digital token includes a unique token identifier;
    assigning, by the at least one computer processor, ownership of each asset token to a wallet that is owned by the liquidity token;
    assigning, by the at least one computer processor, to an asset token a smart contract wallet to support liquidity operations for an asset pool; and
    wrapping, by the at least one computer processor, the liquidity token with a digital fungible token by assigning ownership of the liquidity token to the digital fungible token to thereby create a data structure that permits fractional ownership of assets of the asset pair and revenue represented by the liquidity token.

2. The method of claim 1, further comprising applying an elastic securitization algorithm to allocate resources invested in the assets of the asset pair to meet underlying liquidity needs.

3. The method of claim 1, further comprising receiving a request to deposit one or more assets to at least one asset pool or withdraw one or more assets from the at least one asset pool and depositing the one or more assets to the at least one asset pool or withdrawing the one or more assets from the at least one asset pool.

4. The method of claim 1, wherein the class definition provides properties and functions of the non-fungible digital token.

5. The method of claim 1, further comprising associating a communication interface with the digital token in accordance with the class definition, wherein the communication interface is compliant with a communication specification implemented by an asset registry and which is configured to expose a set of predefined functions, wherein the set of predefined functions include asset ownership transfer functions, asset valuation publication functions, asset attribute determination functions, and/or asset specific processing logic.

6. The method of claim 5, further comprising executing the asset ownership transfer functions, including at least one of a Create Sell Order function, a Cancel Sell Order function, an Accept Sell Order Function, a Create Purchase Order function, a Cancel Purchase Order Function, an Accept Purchase Order Function, and/or a Reject Purchase Order Function.

7. A method for creating a tokenized pairs of assets, the method comprising:
    creating, by at least one computer processor executing instructions stored on a memory, a liquidity token, wherein the liquidity token is a digital token representing a liquidity function for an asset pair and beneficial ownership of revenues produced by the liquidity function and ownership of the asset pair required to support liquidity;
    assigning, by the at least one computer processor, to the liquidity token a smart contract wallet;
    creating, by the at least one computer processor, asset tokens, wherein each asset token is a non-fungible digital token representing each asset pool in an asset pair in accordance with a class definition, and wherein each non-fungible digital token includes a unique token identifier;
    registering, by the at least one computer processor, the asset tokens in association with the corresponding asset as a unique record in a device including a memory of an asset registry;
    assigning, by the at least one computer processor, ownership of each of asset token to a respective wallet that is owned by the liquidity token;
    assigning, by the at least one computer processor, to an asset token a smart contract wallet to support liquidity operations for an asset pool; and wrapping, by the at least one computer processor, the liquidity token with a digital fungible token by assigning ownership of the liquidity token to the digital fungible token to thereby create a data structure that permits fractional ownership of assets of the asset pair and revenue represented by the liquidity token.

8. The method of claim 7, further comprising applying an elastic securitization algorithm to allocate resources invested in the assets of the asset pair to meet underlying liquidity needs.

9. The method of claim 7, further comprising receiving a request to deposit one or more assets to at least one asset pool or withdraw one or more assets from the at least one asset pool and depositing the one or more assets to the at least one asset pool or withdrawing the one or more assets form the at least one asset pool.

10. The method of claim 7, wherein the class definition provides properties and functions of the non-fungible token.

11. The method of claim 7, further comprising associating a communication interface with the digital token in accordance with a class definition, wherein the communication interface is compliant with a communication specification implemented by the asset registry and which is configured to expose a set of predefined functions, wherein the set of predefined functions include asset ownership transfer functions, asset valuation publication functions, asset attribute determination functions, and/or specific processing logic.

12. The method of claim 7, further comprising, wrapping the liquidity token with a digital fungible token by assigning ownership of the liquidity token to the digital fungible token to thereby create a data structure that permits fractional ownership of the assets and revenue represented by the liquidity token.

13. A computer system for creating a data structure representing a tokenized pair of assets comprising:
    at least one computer processor;
    at least one memory; and
    a data structure recorded on a non-transient media;
    wherein the at least one computer processor creates a digital token for each side of an asset pair, wherein each digital token is created in accordance with a class definition, and wherein each digital token includes a unique token identifier that is registered in association with the corresponding asset as a unique record in the at least one memory;
    wherein the at least one computer processor assigns ownership of each of the digital tokens to a respective wallet that is owned by a smart contract;
    wherein a fungible digital token wraps a non-fungible token through an ownership assignment of the non-fungible token to a wallet associated with the fungible digital token to thereby create a data structure that represents revenue generated by providing liquidity between assets of the asset pair;
    wherein the at least one computer processor creates non-fungible asset tokens, wherein each non-fungible asset token represents each asset pool in the asset pair in accordance with the class definition, wherein each non-fungible token includes a unique non-fungible token identifier; and
    wherein the at least one computer processor assigns ownership of each of the asset tokens to a wallet that is owned by a liquidity token.

14. The method of claim 13, wherein an elastic securitization algorithm is applied to allocate resources invested in the assets of the asset pair to meet the underlying liquidity needs.

15. The system of claim 13, wherein the system is operable to receive a request to deposit one or more assets to at least one asset pool or withdraw one or more assets from the at least one asset pool and wherein the at least one computer processor is operable to cause the one or more assets to be deposited into the at least one asset pool or the one or more assets to be withdrawn from the at least one asset pool.

16. The system of claim 13, wherein the class definition provides properties and functions of the non-fungible token.

17. The system of claim 13, wherein the data structure permits fractional ownership of the assets.

18. The system of claim 13, further comprising a communication interface associated with the digital token in accordance with the class definition, wherein the communication interface is compliant with a communication specification implemented by an asset registry and which is configured to expose a set of predefined functions, wherein the set of predefined functions include asset ownership transfer functions, asset valuation publication functions, asset attribute determination functions, and/or asset specific processing logic.

19. The system of claim 18, wherein the asset ownership transfer functions are operable to be executed, and include at least one of a Create Sell Order function, a Cancel Sell Order function, an Accept Sell Order Function, a Create Purchase Order function, a Cancel Purchase Order Function, an Accept Purchase Order Function, and/or a Reject Purchase Order Function.

* * * * *